United States Patent [19]

Wada et al.

[11] Patent Number: 5,563,790
[45] Date of Patent: Oct. 8, 1996

[54] CONTROL APPARATUS FOR MOTOR-DRIVEN POWER STEERING SYSTEM OF MOTOR VEHICLE

[75] Inventors: Shunichi Wada; Masanori Takagi, both of Himeji, Japan

[73] Assignee: Mitsubishi Denki Kabushiki Kaisha, Tokyo, Japan

[21] Appl. No.: 285,106

[22] Filed: Aug. 3, 1994

[30] Foreign Application Priority Data

Mar. 17, 1994 [JP] Japan .................................. 6-047317

[51] Int. Cl.$^6$ ...................................................... B62D 5/04
[52] U.S. Cl. ........................................ 364/424.05; 180/446
[58] Field of Search ..................... 364/424.05; 180/79.1, 180/140, 141, 142, 143

[56] References Cited

U.S. PATENT DOCUMENTS

| | | | |
|---|---|---|---|
| 4,754,828 | 7/1988 | Morishita et al. | 364/424.05 |
| 4,837,690 | 6/1989 | Morishita et al. | 364/424.05 |
| 4,849,889 | 7/1989 | Morishita et al. | 364/424.05 |
| 4,869,334 | 9/1989 | Marumoto et al. | 180/79.1 |
| 4,895,216 | 1/1990 | Fusimi et al. | 364/424.05 |
| 5,156,227 | 10/1992 | Taniguchi et al. | 364/424.05 |
| 5,299,650 | 4/1994 | Wada et al. | 180/79.1 |
| 5,341,891 | 8/1994 | Wada et al. | 180/79.1 |
| 5,414,627 | 5/1995 | Wada et al. | 364/424.05 |

FOREIGN PATENT DOCUMENTS

| | | |
|---|---|---|
| 0243180 | 10/1987 | European Pat. Off. . |
| 4023812 | 7/1990 | Germany . |
| 4027217 | 8/1990 | Germany . |
| 285460 | 11/1989 | Japan . |

*Primary Examiner*—Gary Chin
*Attorney, Agent, or Firm*—Sughrue, Mion, Zinn, Macpeak & Seas

[57] ABSTRACT

A power steering system for a motor vehicle comprises a speed sensor 11, a steering torque sensor 12, a current calculating/driving circuit 21 for outputting a motor current command value on the basis of the vehicle speed and the steering torque, an assist torque generating electric motor 10 coupled to the steering system through an electromagnetic clutch 9, a clutch control circuit 50 for controlling a coupling effort of the electromagnetic clutch, an abnormal torque decision calculating circuit 31 for arithmetically determining an abnormal torque and a vehicle speed corresponding to the abnormal torque for a predetermined reference temporal duration to thereby output both an abnormal torque decision value indicating an abnormal torque corresponding to the vehicle speed detected by the vehicle speed sensor and the reference temporal duration, a load torque arithmetic circuit 33 for arithmetically determining both a load torque value indicating a sum of the steering torque detected by the steering torque sensor and an assist torque generated by the electric motor and a temporal duration of the load torque value, a torque comparison circuit 35 for comparing the load torque value with the abnormal torque decision reference value and comparing the temporal duration of the load torque value with the reference temporal duration, and a motor fault monitor/control circuit 40 responsive to results of the comparisons indicating that the load torque value is greater than the abnormal torque decision value and that the temporal duration of the load torque value is not shorter than the reference temporal duration, to thereby control the clutch control circuit so that the coupling effort of the electromagnetic clutch is lowered in a continuous manner to a predetermined coupling effort which permits manual steering.

36 Claims, 12 Drawing Sheets

CONTROL APPARATUS FOR MOTOR-DRIVEN POWER STEERING SYSTEM OF MOTOR VEHICLE

BACKGROUND OF THE INVENTION

1. Field of the Invention

The present invention generally relates to a motor-driven power steering system for a motor vehicle or automobile which is adapted to assist a driver in manipulating a steering wheel or handle by making use of an assist torque generated by a reversible motor which is operatively coupled to the steering system. In particular, the invention is concerned with a control apparatus for the motor-driven power steering system which allows smooth transition of steering operation from a motor-aided mode to a manual mode when the assist torque generating motor falls into a locked or nearly locked state for some reason. More particularly, the invention is concerned with an apparatus for controlling an electromagnetic clutch through which an assist torque generated by the motor is transmitted to the steering system such that a coupling effort of the clutch is decreased continuously to a level allowing manual operation of the steering wheel when the motor falls into a locked or nearly locked state. Hereinafter, the combination of the motor-driven power steering system and the control apparatus will also be referred to as the motor-driven power steering control system.

2. Description of the Related Art

In the motor-driven (or electrically driven) power steering control system for a motor vehicle, a steering torque applied to a steering wheel by a driver is detected by a torque sensor to thereby allow a reversible electric motor of the power steering system to generate an assist torque of a magnitude which is substantially proportional to the detected steering torque while taking into account the speed of the motor vehicle (hereinafter referred to as the vehicle speed), wherein the assist torque thus generated is applied to a steering shaft assembly for aiding or facilitating the driver in manipulating the steering wheel.

In the power steering system of the type mentioned above, when the motor is locked due to some fault, the assist torque can no longer be generated. Besides, the locked state of the motor presents a great obstacle to the manipulation of the steering wheel, making it difficult or impossible to drive the motor vehicle comfortably.

As a motor-driven power steering control system which is equipped with measures for coping with the unwanted situation mentioned above, there is known a system disclosed in, for example, Japanese Unexamined Patent Application Publication No. 285460/1989 (JP-A-H1-285460).

FIG. 9 is a block diagram showing a structure of the motor-driven power steering control system described in JP-A-H1-285460. In this known motor-driven power steering system, a steering torque applied to a steering wheel or handle of a motor vehicle by a driver is detected by a torque sensor 101 in the state where an assist torque generating motor 100 is operatively connected to a steering shaft (not shown) by means of a clutch (also not shown). The detected torque signal outputted from the torque sensor 101 is applied to a torque neutral point detection circuit 102 via a differentiating circuit 116. In the torque neutral point detection circuit 102, a torque neutral point indicating a neutral position or state of the steering wheel is detected. The output of the torque neutral point detection circuit 102 is logically ORed with an output of a second level setting/comparison device 103 (at 120). A logical sum signal resulting from the ORing operation is supplied to a relay control circuit 117 via a self-hold circuit 118 for controlling a relay 105 interposed between a clutch driver 112 and a power source 111 such as an onboard battery. Simultaneously, the output of the torque neutral point detection circuit 102 is logically ORed with the output of a first level setting device 104 (at 121), the resulting logical sum signal being supplied to a clutch current control circuit 106.

With the structure described above, when it is detected by the torque neutral point detection circuit 102 that the magnitude of torque as detected by the torque sensor 101 is outside of a neutral region and when the current flowing through the motor 100 as detected by a motor current detecting circuit 110 exceeds a first level set at the first level setting device 104, a control signal is applied to the clutch current control circuit 106 which responds thereto by decreasing a clutch current supplied to a clutch driver 112. As a result of this, a slip takes place in an electromagnetic clutch 113 which serves to transmit a torque generated by the motor 100 to the steering shaft. In this manner, when the motor current increases due to semi-locking of the motor 100, the clutch current is decreased to loosen the mechanical coupling between the motor 100 and the steering shaft to thereby allow the steering wheel to be manipulated in a region close to the state where the steering wheel is manipulated without the aid of the assist torque. On the other hand, when the motor 100 is actually locked, accompanied with a further increase in the motor current, the relay 105 is opened to deenergize the clutch driver 112 to thereby set the manipulation of the steering wheel to the manual manipulation mode in the intrinsic sense. In this way, the steering wheel is protected against falling into the locked state or manipulation-heavy state even when the motor 100 is locked or nearly locked, whereby safety is assured for driving the motor vehicle. Parenthetically, the assist torque generating motor 100 is driven through a PWM switching driver circuit 114 under the control of a microcomputer 115 which is in charge of controlling the whole system.

The motor-driven power steering system described above however suffers from a problem that because the clutch is controlled on the basis of the output signal of the torque neutral point detection circuit 102 and the motor current detected by the motor current detecting circuit 110, it is impossible to decide instantaneously and accurately an occurrence of locking in the motor 100 as well as releasing thereof from the locked state. As a consequence, the clutch tends to be unnecessarily left in the slip state for a long time after the restoration of the motor from the locked state, whereby wear or deterioration of the clutch is accelerated, resulting in that the assist torque generated by the motor 100 can not effectively be transmitted to the steering shaft, thus presenting a problem.

As a motor-driven power steering system designed to cope with the problem mentioned above, there is known a motor-driven power steering control system as shown in FIG. 10.

Referring to FIG. 10, this known motor-driven power steering control system includes a torque sensor 111, a vehicle speed sensor 112, a current calculating/driving means 110 for arithmetically determining or calculating a motor current command value $I_O$ on the basis of a steering torque T derived from the output of the torque sensor 111 and a vehicle speed V derived from the vehicle speed sensor 112 in accordance with such relation as illustrated in FIG. 11, an assist torque generating motor 113 driven in accordance with the command value $I_O$, and a clutch control means 120 for changing a control signal C for an electromagnetic clutch 121 from a high level (ON-level) to a low level (OFF-level) when the vehicle speed V derived from the vehicle speed sensor 112 has attained a reference vehicle speed $V_0$, as illustrated in FIG. 12. A reference numeral 114 designates a motor current detecting means.

With the arrangement of the motor-driven power steering system described above, the clutch control means 120 sets the clutch control signal C at the high level so long as the vehicle speed V does not exceeds the reference vehicle speed $V_O$ to thereby allow the electromagnetic clutch 121 to be coupled to the motor 113, while the current calculating/driving means 110 controls the current supply to the motor 113 in accordance with the motor current command value $I_O$ determined on the basis of the vehicle speed V and the steering torque T, to thereby allow the motor 113 to generate an assist torque of corresponding magnitude.

On the other hand, when the motor vehicle is running at a high speed with the vehicle speed V exceeding the reference vehicle speed $V_0$, the clutch control means 120 sets the clutch control signal C at the low level to thereby leave the electromagnetic clutch 121 disconnected from the motor 113, while the motor current command value $I_O$ generated by the current calculating/driving means 110 is reset to zero. In other words, so long as the motor vehicle is running at a speed higher than the reference level V0, the electromagnetic clutch 121 is disconnected to thereby exclude the possibility of the steering wheel falling into the locked or manipulation-heavy state. In this way, safety is assured in driving the motor vehicle.

With the motor-driven power steering control system described above, the electromagnetic clutch 121 can be coupled to or disconnected from the motor 113 instantaneously and accurately. However, the automatic operation of the electromagnetic clutch 121 in response to a change of the vehicle speed V around the reference vehicle speed $V_O$ is accompanied with harsh noise, which is far beyond acceptance from the environmental standpoint. Besides, shock is generated upon operation of the electromagnetic clutch 121 and transmitted to the driver, to his or her discomfort.

As a technique which tackles the solution of the above problem, there may be mentioned a motor-driven power steering control system which is disclosed in Japanese Unexamined Patent Application Publication No. 85391/1993 (JP-A-H5-85391).

FIG. 13 is a block diagram showing this known motor-driven power steering control system. In this figure, components same as or equivalent to those shown in FIG. 10 are denoted by like reference symbols. Referring to FIG. 13, the motor-driven power steering control system is similar to that shown in FIG. 10 in that it includes a torque sensor 111, a vehicle speed sensor 112, a current calculation/driver means 110 for arithmetically determining or calculating a motor current command value $I_O$ on the basis of a steering torque T derived from the output of the torque sensor 111 and a vehicle speed V derived from the output of the vehicle speed sensor 112, and an electromagnetic clutch 121, and differs from the latter in that there are provided a clutch current detecting means 130 and a clutch control means 131 which is adapted to operate in cooperation with the clutch current detecting means 130.

The clutch current detecting means 130 detects a clutch current $I_C$ which actually flows through the electromagnetic clutch 121 on the basis of the clutch control signal C supplied from the clutch control means 131. To say in another way, the clutch control means 131 generates the clutch control signal C in order to set the clutch current $I_C$ for the electromagnetic clutch 121.

More specifically, so long as the vehicle speed V is lower than the reference vehicle speed $V_O$, the clutch current detecting means 130 outputs the clutch current $I_C$ of a level $I_V$ to drive the electromagnetic clutch 121 for allowing the motor 113 to be linked to the steering shaft so that an assist torque of a magnitude which decreases linearly as the vehicle speed increases is available, as is illustrated in FIG. 14. On the other hand, when the vehicle speed V is higher than the reference vehicle speed $V_O$ (e.g. 50 km/h) inclusive, the clutch current detecting means 130 outputs the clutch current $I_C$ of a constant level $I_{CR}$ which is lower than the level $I_V$, as a result of which the coupling power of the electromagnetic clutch 121 is enfeebled.

In this way, the assist torque generated by the motor 113 is controlled in accordance with the vehicle speed V without disconnecting completely the coupling established between the steering shaft and the assist torque generating motor via the electromagnetic clutch 121, whereby generation of noise and shock upon coupling/disconnecting operation of the electromagnetic clutch 121, as experienced in the case of the system shown in FIG. 10, is effectively prevented.

The motor-driven power steering system disclosed in JP-A-H5-85391 however suffers a problem that the manufacturing cost therefor becomes very high because of the necessity for the clutch current detecting means 130 implemented in a complicated circuit configuration for executing intricate processing in order to detect and control the clutch current $I_C$. Besides, control of the clutch current $I_C$ requires processing of high accuracy which is difficult to perform in practical applications.

SUMMARY OF THE INVENTION

In the light of the state of the art described above, it is an object of the present invention to solve the problems of the techniques known heretofore and provide a control apparatus for a motor-driven (electrically driven) power steering system of a motor vehicle, which apparatus is capable of controlling an electromagnetic clutch with high accuracy and reliability to thereby positively prevent a steering wheel of the motor vehicle from falling into locked or manipulation-heavy (or difficult) state.

Another object of the invention to provide a motor-driven power steering control apparatus of the type mentioned above which can be implemented in a simplified and inexpensive structure.

A further object of the present invention is to provide a motor-driven power steering control apparatus which is capable of suppressing effectively wasteful slippage of the electromagnetic clutch as well as generation of noise and shock upon operation thereof.

It is yet another object of the invention to provide a method of controlling an electromagnetic clutch of a motor-driven power steering control system, which method can be carried out by a correspondingly programmed microcomputer.

In view of the above and other objects which will become apparent as description proceeds, the present invention is directed to a motor-driven power steering system of a motor vehicle which includes a steering mechanism for steering the motor vehicle, an electric motor for generating an assist torque to be applied to the steering mechanism for facilitating steering operation of the motor vehicle, and an electromagnetic clutch means for transmitting the assist torque to the steering mechanism, wherein the electromagnetic clutch means is of such a type that magnitude of a coupling effort thereof can continuously and controllably changed at least over a range from an electrically partially energized state of the electromagnetic clutch means to an electrically fully energized state thereof, and wherein in the electrically fully energized state of the electromagnetic clutch means, the assist torque generated by the motor can be transmitted to the steering mechanism at maximum, while in the electrically partially energized state of the electromagnetic clutch means, transmission of the assist torque to the steering mechanism is limited to such extent that the steering mechanism can manually be manipulated independent of the state of the electric motor.

According to a general aspect of the invention in its broadest sense, there is provided for the power steering system described above a control apparatus for controlling the electromagnetic clutch means, which apparatus includes a clutch control means adapted for controlling the coupling effort of the electromagnetic clutch means over the aforementioned range, an abnormal torque detecting means for detecting an abnormally large torque applied to the steering mechanism, to thereby output an abnormal torque detection signal, and a motor fault monitor/control means operatively connected to the abnormal torque detecting means and responsive to the abnormal torque detection signal for thereby causing the clutch control means to control the electromagnetic clutch means so that the electrical energization of the electromagnetic clutch means is continuously decreased to a level corresponding to the electrically partially energized state.

More specifically, according to an aspect of the present invention, there is provided a control apparatus for a motor-driven power steering system of a motor vehicle, which apparatus comprises a vehicle speed detecting means for detecting a vehicle speed of the motor vehicle, a steering torque detecting means for detecting a steering torque applied to the steering system, a current calculating/driving means for outputting a motor current command value on the basis of the vehicle speed detected by the vehicle speed detecting means and a steering torque detected by the steering torque detecting means, an assist torque generating electric motor operatively coupled to a steering mechanism through the medium of an electromagnetic clutch means and generating an assist torque to be applied to the steering system on the basis of the motor current command value, a clutch control means for controlling a coupling effort of the electromagnetic clutch means, an abnormal torque decision reference value arithmetic means for arithmetically determining an abnormal torque and a vehicle speed corresponding to the abnormal torque during a predetermined reference period to thereby output an abnormal torque decision reference value indicating an abnormal torque corresponding to the vehicle speed detected by the vehicle speed detecting means, a load torque arithmetic means for arithmetically determining a load torque value indicating a sum of the steering torque detected by the steering torque detecting means and an assist torque generated by the electric motor, a torque comparison means for comparing the load torque value with the abnormal torque decision reference value, and a motor fault monitor/control means responsive to a result of the comparison indicating that the load torque value is greater than the abnormal torque decision reference value, to thereby control the clutch control means so that the coupling effort of the electromagnetic clutch means is lowered in a continuous manner to a predetermined coupling effort which permits manual operation of the steering system.

When the assist torque generating motor is in locked or nearly locked state, the steering torque applied to the steering wheel by the driver will increase significantly or abnormally in an effort to overcome a heavy load provided by the motor. With the arrangements described above, this increase in the steering torque will instantaneously be reflected as an abnormal increase in the output signal of the steering torque detecting means. In response, the control apparatus reduces continuously the coupling effort of the electromagnetic clutch means to a level where the driver can manipulate the steering wheel without difficulty. Since this control of the electromagnetic clutch involves no turning-off operation of the electromagnetic clutch means from the onstate, any appreciable shock or noise will not be generated. Besides, the electromagnetic clutch means is subjected to substantially no useless frictional slippage and thus it can enjoy an extended use life and effective operation. Further, high reliability of the steering and hence security and comfortableness in driving the motor vehicle can be ensured without incurring inexpensiveness of the apparatus because the complicated clutch detecting current mentioned hereinbefore is rendered unnecessary.

In a preferred mode for carrying out the invention, the electromagnetic clutch means may be constituted by a disk type electromagnetic clutch substantially of zero gap while the clutch control means may be so arranged as to supply a pulse width modulated current for electrically energizing the electromagnetic clutch means, and wherein duty cycle of the pulse width modulated current is linearly changed in response to the abnormal torque detection signal.

According to a second aspect of the invention, there is provided a control apparatus for a motor-driven power steering system of a motor vehicle, which system comprises a vehicle speed sensor for detecting vehicle speed of the motor vehicle, a steering torque sensor for detecting a steering torque applied to the steering system, a current calculating/driving circuit for outputting a motor current command value on the basis of the vehicle speed detected by the vehicle speed sensor and a steering torque detected by the steering torque sensor, an assist torque generating electric motor coupled to the steering system through the medium of an electromagnetic clutch and generating an assist torque to be applied to the steering system on the basis of the motor current command value, a clutch control circuit for controlling a coupling effort of the electromagnetic clutch, an abnormal torque decision calculating circuit for arithmetically determining an abnormal torque and a vehicle speed corresponding to the abnormal torque over a predetermined reference temporal duration to thereby output both an abnormal torque decision reference value indicating an abnormal torque corresponding to the vehicle speed detected by the vehicle speed sensor and the reference temporal duration, a load torque arithmetic circuit for arithmetically determining both a decided load torque value indicating a sum of the steering torque detected by the steering torque sensor and an assist torque generated by the electric motor and a temporal duration of the decided load torque value, a torque comparison circuit for comparing the decided load torque value with the abnormal torque decision value and comparing the temporal duration of the decided load torque value with the reference temporal duration, and a motor fault monitor/control circuit responsive to results of the comparisons indicating that the decided load torque value is greater than the abnormal torque decision value and that the temporal duration of the decided load torque value is not shorter than the reference temporal duration, to thereby control the clutch control circuit so that the coupling effort of the electromagnetic clutch is lowered in a continuous manner to a predetermined coupling effort which permits manual steering.

In the motor-driven power steering system which the invention concerns, the assist torque generating motor itself is controlled in dependence on the steering torque applied to the steering wheel and the vehicle speed of the automobile. Further, the motor is reversibly rotated. Accordingly, the motor may transiently fall into locked or nearly locked state only for a short period. In such case, decision to the effect that the motor is locked or nearly locked should be prevented. With the above-mentioned structure of the control apparatus, the duration of the abnormal load torque is compared with a reference value, whereby the decision as to the state of the motor can be made more accurately and reliably.

When the assist torque is not applied to the steering system due to disconnected state of the electromagnetic clutch, an abnormally large torque may be applied to the steering wheel notwithstanding the motor is running. In that case, the motor and the steering system should be coupled without any appreciable shock and noise. To this end, in another mode for carrying out the invention, the control apparatus for a power steering system may include a motor rotation decision circuit for deciding whether the assist torque generating motor is rotating or not, wherein when it is decided by the motor rotation decision circuit that the assist torque generating motor is rotating, the motor fault monitor/control circuit controls the clutch control circuit such that the coupling effort of the electromagnetic clutch is continuously increased up to a predetermined level.

In the case described above, the comparison processing mentioned previously should not be performed in order to evade positively erroneous operation. Accordingly, in a further preferred mode for carrying out the invention, the control apparatus for a power steering system may further include a torque comparison inhibiting circuit for inhibiting the comparing operation of the torque comparison circuit when decision is made by the motor rotation decision circuit that the assist torque generating motor is rotating.

In dependence on the situation which the motor vehicle encounters in the course of driving, the driver may steeply manipulate the steering wheel only momentarily over a large angle of steering. In that case, an abnormally large steering torque may possibly be detected notwithstanding the motor is running normally. In that case, the control of the clutch should be evaded. Accordingly, in a further preferred mode for carrying out the invention, the control apparatus mentioned above may include a steering angle sensor for detecting an angle of steering of the steering system and a torque comparison inhibiting circuit for disabling the comparing operation of the torque comparison circuit when the angle of steering is not smaller than a predetermined angle. More preferably, the torque comparison inhibiting circuit may be so implemented as to read from a memory storing a plurality of reference steering angles previously determined in correspondence to a plurality of different vehicle speeds a reference steering angle which coincides with a vehicle speed detected by the vehicle speed sensor to compare the steering angle detected by the steering angle sensor with the reference steering angle for thereby disabling the comparing operation of the torque comparison circuit when the detected angle of steering is not smaller than the reference angle of steering.

In yet a further preferred mode for carrying out the invention, the control apparatus for a power steering system may further comprise a torque comparison inhibiting circuit for disabling the comparing operation of the torque comparison circuit when a vehicle speed detected by the vehicle speed sensor is not higher than a reference vehicle speed.

According to yet a further aspect of the invention, there is provided a method of controlling an electromagnetic clutch means of a motor-driven power steering control system for a motor vehicle, which method includes the steps of storing reference torque values determined previously in correspondence to predetermined vehicle speeds, respectively, detecting a current vehicle speed, detecting a steering torque being applied to the steering mechanism, reading out from the predetermined reference torque value a reference torque value which corresponds to the current vehicle speed, detecting a motor current flowing through the electric motor to generate a motor current signal, determining a load torque acting on the steering system on the basis of the detected steering torque and the motor current to thereby decide a load torque, comparing the load torque with the reference torque value as read out to thereby output an abnormal torque signal when the load torque exceeds the reference torque value, and controlling the electromagnetic clutch means in response to the abnormal torque signal so that the electrical energization of the electromagnetic clutch means is continuously decreased to a level corresponding to the electrically partially energized state.

The control method described above can be carried out by using a correspondingly programmed microcomputer chip to a great advantage.

The above other objects, features and attendant advantages of the present invention will more clearly be understood by reading the following description of the preferred embodiments thereof taken, only by way of example, in conjunction with the drawings.

DESCRIPTION OF THE PREFERRED EMBODIMENTS

Now, the present invention will be described in detail in conjunction with the preferred or exemplary embodiments thereof by reference to the drawings.

Embodiment 1

Figure 1:
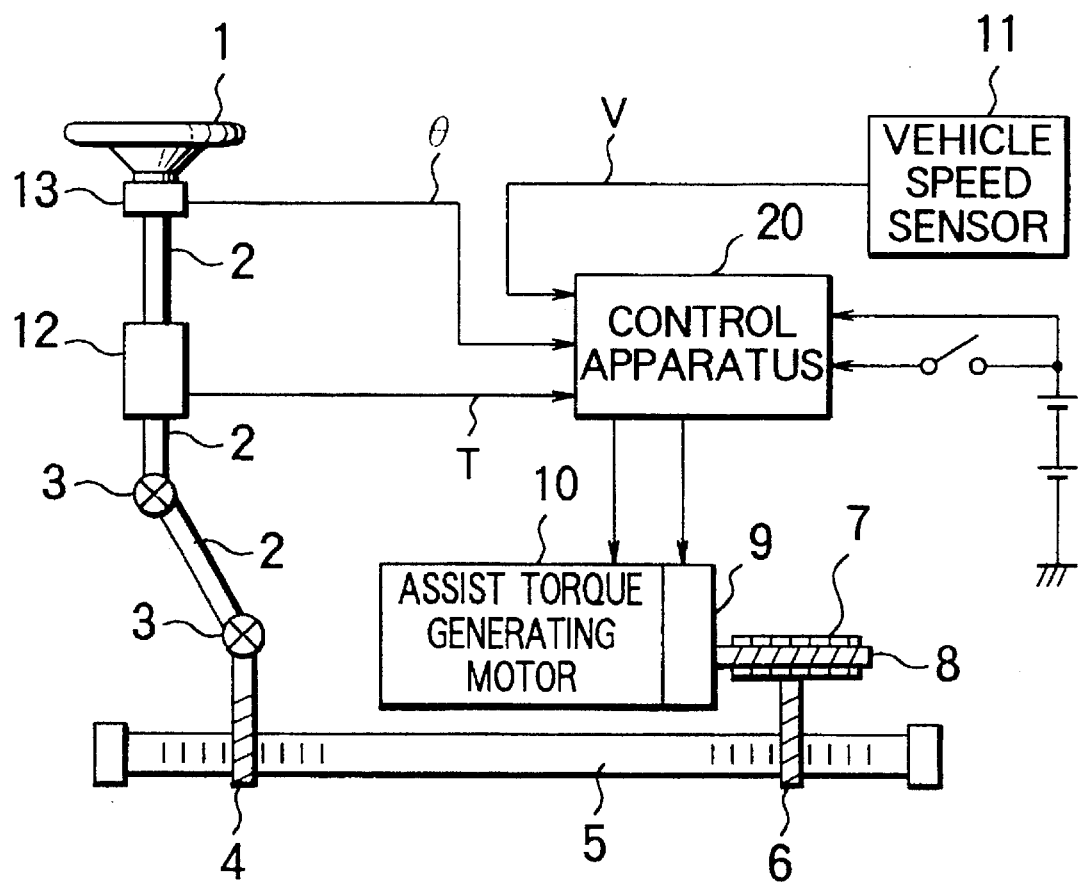
FIG. 1 shows only schematically a general structure of a motor-driven power steering system to which the invention can be applied.

FIG. 1 shows only schematically a general structure of a motor-driven power steering system to which the invention can be applied. Referring to the figure, a steering wheel 1 is mounted at a top end of a steering shaft train including a plurality of shafts 2 (hereinafter collectively referred to as the steering shaft) which are interconnected by universal joints 3. Mounted to a bottom end of the steering shaft 2 is a pinion shaft 4 which is adapted to mesh with a rack 5 at one end portion thereof. Thus, when the rack 5 is moved reciprocatively along the longitudinal axis thereof, the steering shaft 2 is rotated as a whole in the direction which depends on the moving direction of the rack 5 (i.e., rightwards or leftwards as viewed in the figure). Meshing with the rack 5 at the other end portion thereof is a pinion shaft 6 on which a worm wheel 7 is fixedly mounted. The worm wheel 7 meshes with a worm 8 which in turn is coupled to a reversible motor 10 for generating a steering assist torque through an interposed electromagnetic clutch 9.

In operation, when the motor 10 is electrically energized in the state where the electromagnetic clutch 9 is coupled, the worm 8 is rotated, which results in rotation of the worm wheel 7 and hence the pinion shaft 6 in the corresponding direction, whereby the rack 5 is caused to move rightwards or leftwards, as viewed in the figure. Thus, the pinion shaft 4 is rotated in the corresponding direction. In this manner, an output torque (referred to as the assist torque) generated by the reversible motor 10 is transmitted to the steering wheel 1 via the electromagnetic clutch 9, the rack/worm gear train and the steering shaft 2, to thereby assist a driver of the motor vehicle in his or her manipulation of the steering wheel 1.

The control of the reversible motor 10 for generating the assist torque to be transmitted to the steering shaft 2 and hence the steering wheel 1 is performed by a control apparatus 20. To this end, there are provided a vehicle speed sensor 11 and a torque sensor 12 which serve as a vehicle speed detecting means and a steering torque detecting means, respectively, wherein a vehicle speed signal V outputted by the vehicle speed sensor 11 and a steering torque signal T outputted by the torque sensor 12 are supplied to the control apparatus 20 as control information for controlling the reversible motor 10.

Figure 2:
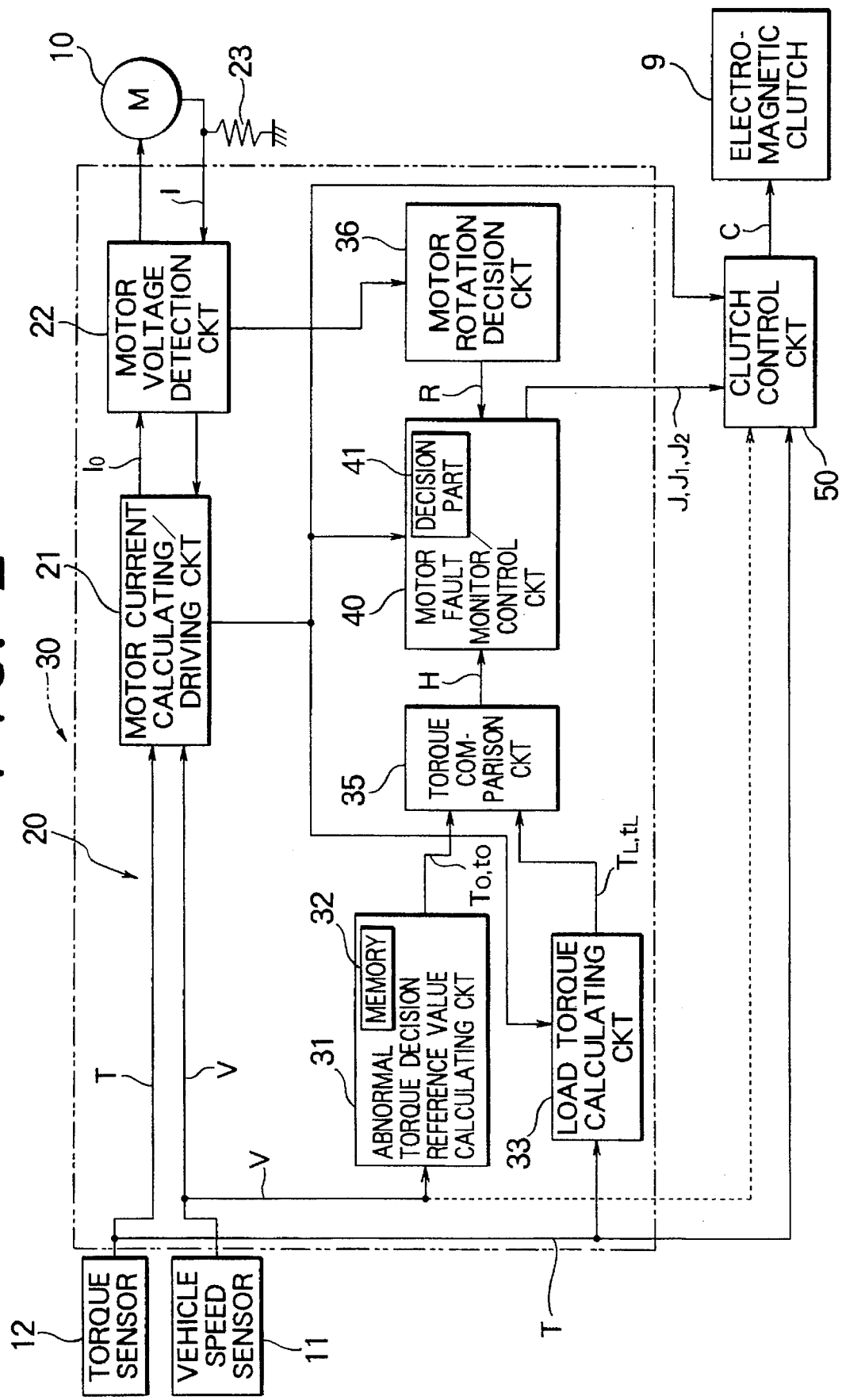
FIG. 2 is a block diagram showing a circuit configuration of a control apparatus for a motor-driven power steering system according to a first embodiment of the invention.

Next, description will turn to the control apparatus 20. FIG. 2 is a block diagram showing a circuit configuration of the control apparatus 20. As can be seen in the figure, the control apparatus 20 includes as major components a central processing unit 30 which may be constituted by a microcomputer and which serves as a control means, and a clutch control circuit 50 serving as a clutch control means.

A current calculating/driving means in the form of a current calculating/driving circuit 21 is so arranged as to generate a motor current command value $I_O$ on the basis of the vehicle speed V detected by the vehicle speed sensor 11 and the steering torque T detected by the torque sensor 12. More specifically, the current calculating/driving circuit 21 controls a voltage applied to the assist torque generating motor 10 so that a current corresponding to the motor current command value $I_O$ flows through the motor 10 by taking into account an actual motor current I fed back from a motor current detecting circuit 23, as will be detailed later on. Interposed between the current calculating/driving circuit 21 and the motor 10 are a motor voltage detecting circuit 22 for detecting the voltage applied across the motor 10 and the aforementioned motor current detecting circuit 23.

The motor voltage detection circuit 22 is adapted to detect the voltage applied across the motor 10 on the basis of the supply voltage and the pulse width (or duty ratio) of PWM (Pulse-Width Modulated) pulse signals delivered from the central processing unit 30 while taking into consideration a voltage drop occurring across the motor 10.

On the other hand, the motor current detection circuit 23 serves to detect the actual motor current I which is inputted to the current calculating/driving circuit 21. In more detail, the motor 10 is supplied with electric power from a power source such as an onboard battery of the motor vehicle via an H-bridge circuit including a plurality of switching elements controlled by the PWM signals generated by circuit means incorporated in the central processing unit 30 on the basis of the vehicle speed V and the steering torque T, although not shown. In a current feed path extending to the motor 10 from the power source, a shunt resistor is inserted. The motor current detection circuit 23 detects a voltage appearing across the shunt resistor when the motor current flows. On the basis of this voltage, the motor current detection circuit 23 determines the actual motor current I. Since the current detecting circuit serving for this function is known in the art, any further description will be unnecessary. Further, although the motor current detection circuit 23 is shown in the simple form of a resistor, it should be understood that it may equally be constituted by a current transducer which per se is also known.

Further, the central processing unit or microcomputer 30 includes an abnormal torque decision reference value calculating circuit 31 constituting a so-called abnormal torque decision reference value arithmetic means, a load torque calculating circuit 33 constituting a load torque arithmetic means, a torque comparison circuit 35, a motor rotation decision circuit 36, and a motor fault monitor/control circuit 40 for coping with a fault taking place in the assist torque generating motor 10.

Figure 3:
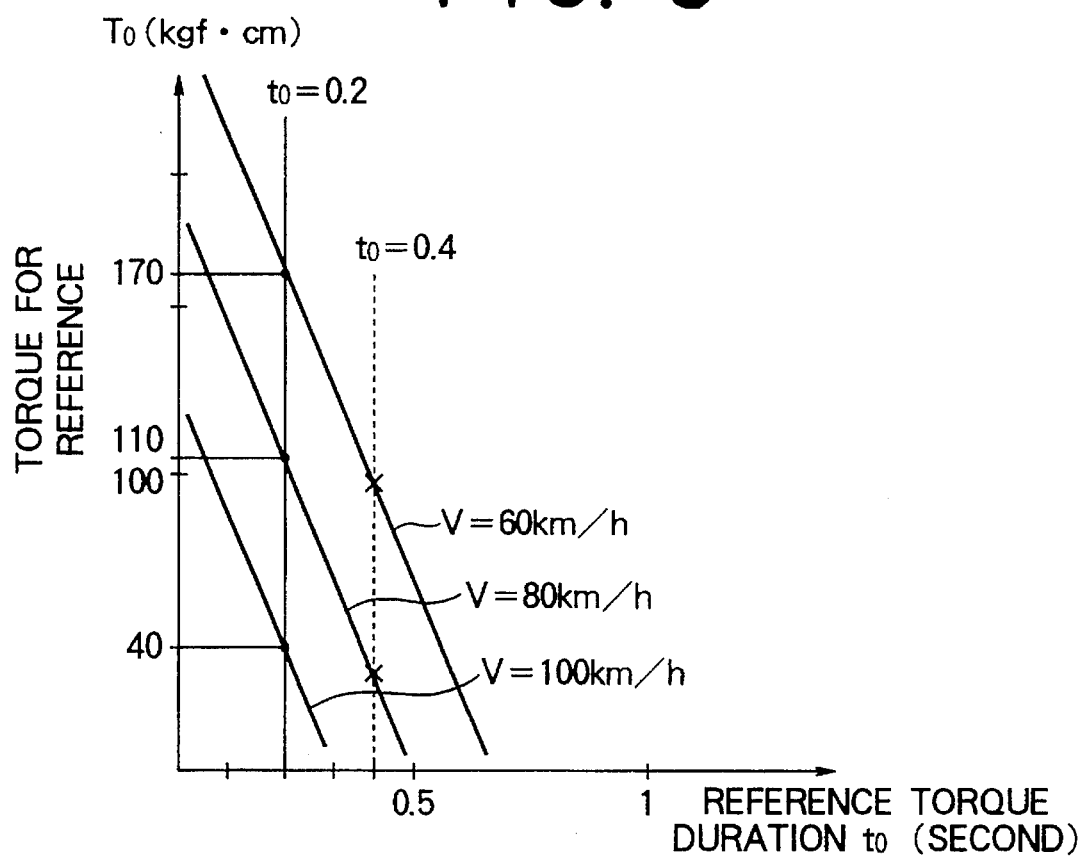
FIG. 3 is a view showing relations between reference durations and abnormal torque decision reference values with vehicle speeds as a parameter which are used in the control effected by the apparatus shown in FIG. 2.

The abnormal torque decision reference value calculating circuit 31 includes a memory 32 which stores in the form of a table abnormal torque values and temporal durations thereof which are previously determined experimentally at expected various vehicle speeds. More specifically, abnormal values of steering torque applied to the steering system by the driver are previously determined for various vehicle speeds, and relations between the abnormal torque values and the temporal durations thereof (i.e., temporal period during which the abnormal torque continues to be applied) are stored in the memory 32 which may be constituted by a ROM (Read-Only Memory) with the vehicle speed V being taken as a parameter, as illustrated in FIG. 3. At this junction, terminological definition will be helpful. As experience shows, the steering wheel becomes more heavy to manipulate with the torque applied to the steering shaft increasing, as the vehicle speed lowers. Further, when the assist torque generating motor is locked or nearly locked in the state coupled to the steering shaft, the driver will try to increase the torque applied to the steering wheel in an effort to overcome the resistance provided by the motor in the locked state. Of course, the steering torque applied in this case will depend on the vehicle speed as well. Thus, the magnitude of the torque applied to the steering shaft can be used as a parameter for deciding whether or not the assist torque generating motor is locked or nearly locked, although it depends on the vehicle speed. Needless to say, the assist torque generating motor is constituted by a reversible motor. Accordingly, the motor may be locked only transiently, e.g. upon changing of the rotating direction. In that case, a decision that the motor is locked should not be made. Thus, the duration of an abnormally large torque applied to the steering shaft can also be used as a parameter indicating whether or not the motor is locked. Experience shows that the duration mentioned above will also vary as a function of the vehicle speed. Thus, with the phrase "abnormal torque decision reference value", it is contemplated to mean a used value to be referenced in deciding whether or not a torque as applied to the steering shaft at a given speed of the motor is abnormally high. Of course, the duration mentioned above can be previously set and referenced for this decision with a view to enhancing further the reliability thereof. This duration may be referred to as the reference temporal duration. Now, turning back to FIG. 2, the abnormal torque decision reference value calculating circuit 31 reads out from the memory 32 the abnormal torque decision reference values $T_O$ corresponding to a reference temporal duration $t_O$ set previously, to thereby determine relations between the abnormal torque decision reference values $T_O$ and the vehicle speeds V, the relations thus determined being held in the form of a table in a buffer memory (not shown). By referencing this table, the abnormal torque decision reference value $T_O$ which is determined on the basis of the vehicle speed V inputted from the vehicle speed sensor 11 is delivered to the torque comparison circuit 35 together with the corresponding reference duration $t_O$.

Figure 4:
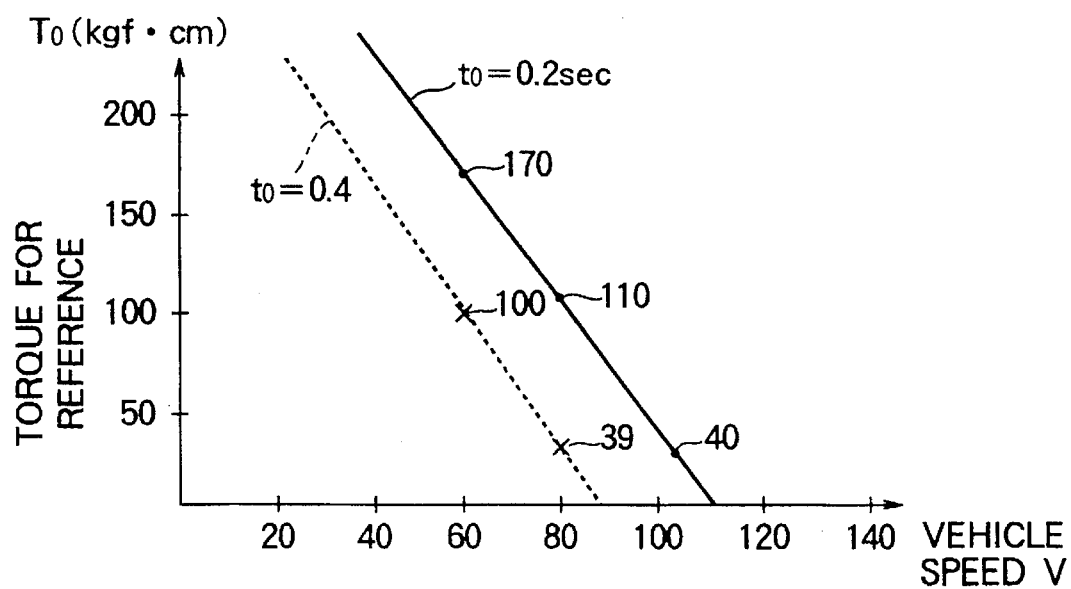
FIG. 4 is a view showing relations between vehicle speeds and abnormal torque decision reference values which are used in effecting the control according to the invention.

By way of example, consider the reference duration $t_O$ previously set to be 0.2 second. In that case, the abnormal torque decision reference values $T_O$ corresponding to the reference duration $t_o$ are set to be 40 kgf·cm, 110 kgf·cm and 170 kgf·cm, respectively, as can be seen in FIG. 3. Accordingly, when these abnormal torque decision reference values $T_O$ are related to the vehicle speed V, it can be determined that the abnormal torque decision reference value $T_O$ is 170 kgf·cm, 110 kgf·cm and 40 kgf·cm, when the vehicle speed V is 60 km/h, 80 kgf·cm and 100 km/h, respectively, as can be seen in FIG. 4.

Thus, when the steering torque T of 40 kgf·cm is detected by the torque sensor 12 when the vehicle speed V is 100 km/h, it is then estimated or decided that the steering torque T of the above value takes place in the locked or nearly locked state of the motor 10 provided that the temporal duration $t_L$ exceeds 0.2 second inclusive thereof. To say it another way, when a steering torque greater than 40 kgf·cm is detected as being applied to the steering wheel by the torque sensor 12 for a duration not shorter than 0.2 second at a vehicle speed of 100 km/h, it can safely be decided that the motor 10 is in the locked or nearly locked state.

The load torque calculating circuit 33 serves to determine a sum of the steering torque T detected by the torque sensor 12 and the assist torque generated by the motor 10. In more detail, the steering torque T and the motor current command value $I_O$ generated by the current calculating/driving circuit 21 or the actual motor current I are inputted to the load torque calculating circuit 33, whereon a sum represented by T+k, $I_O$ or T+k.I (where k represents a scaling factor) is determined by the load torque calculating circuit 33, the result of which is supplied as a decided load torque value $T_L$ to the torque comparison circuit 35. Further, it should be mentioned that the load torque calculating circuit 33 also outputs the temporal duration $t_L$ of the decided load torque value $T_L$ to the torque comparison circuit 35.

The torque comparison circuit 35 is adapted to compare the abnormal torque decision reference value $T_O$ supplied from the abnormal torque decision reference value calculating circuit 31 with the decided load torque value $T_L$ mentioned above while comparing the reference temporal duration $t_O$ mentioned above with the temporal duration $t_L$, whereby a corresponding comparison result signal H is supplied to the motor fault monitor/control circuit 40.

On the other hand, the motor rotation decision circuit 36 determines whether the motor 10 is rotating or not, the result of which is outputted as a motor rotation decision signal R. In more detail, the motor rotation decision circuit 36 is so designed as to estimate a voltage regenerated by the motor 10 on the basis of the actual motor current I determined from the motor voltage detected by the motor voltage detection circuit 22 and the resistance of an armature (not shown) of the motor 10 when the latter is stationary, to thereby estimate whether the motor 10 is rotating or not.

When the comparison result signal H outputted from the torque comparison circuit 35 indicates that the decided load torque value $T_L$ is greater than the abnormal torque decision reference value $T_O$ (i.e., $T_L > T_O$) and that the temporal duration $t_L$ of the decided load torque is equal to or longer than the reference duration $t_O$ of the abnormal torque (i.e., $t_L \geq t_0$), and when the signal R generated by the motor rotation decision circuit 36 indicates that the motor 10 is not rotating, the motor fault monitor/control circuit 40 outputs a coupling control signal to a clutch control circuit 50 so that the degree of coupling (which may also be referred to as the coupling effort) of the electromagnetic clutch 9 is decreased or lessened continuously to a predetermined level which permits manual manipulation of the steering wheel 1 without difficulty.

More specifically, unless the comparison result signal H indicates that $T_L > T_O$ and $t_L \geq t_O$, the motor fault monitor/control circuit 40 issues to the clutch control circuit 50 a coupling control signal J which allows the electromagnetic clutch 9 to remain in the fully energized state. In contrast, when the comparison result signal H indicates that $T_L > T_O$ and $t_L \geq t_O$ and when the motor rotation decision signal R outputted from the motor rotation decision circuit 36 indicates that the motor 10 is not rotating, it is then decided that the motor 10 is in the locked or nearly locked state, whereon a decision part 41 incorporated in the motor fault monitor/control circuit 40 determines the magnitude of the steering torque T of the steering shaft 2. More specifically, the decision part 41 compares the steering torque T with a predetermined torque value $T_1$ which permits steering (e.g. 50 kgf·cm). When the comparison shows that the steering torque T is greater than the predetermined torque value $T_1$, the motor fault monitor/control circuit 40 outputs a coupling control signal $J_1$ which is effective to reduce continuously the coupling effort of the electromagnetic clutch 9 to a predetermined level which allows the driver to manipulate the steering wheel 1, as a result of which the steering torque T acting on the steering shaft 2 is lowered to the predetermined torque value $T_1$. On the contrary, when it is decided that the steering torque T is smaller than the predetermined torque value $T_1$, the motor fault monitor/control circuit 40 issues to the clutch control circuit 50 a coupling control signal $J_2$ which is effective for increasing progressively and continuously the coupling effort of the electromagnetic clutch 9 to the above-mentioned level so that the steering torque T of the steering shaft 2 is increased to the predetermined torque value $T_1$. Further, in case the motor rotation decision signal R indicates that the motor 10 is rotating, the motor fault monitor/control circuit 40 issues to the clutch control circuit 50 such a control signal which is effective to increase gradually and continuously the coupling effort of the electromagnetic clutch 9 to the aforementioned predetermined level so that the steering torque T of the steering shaft 2 is increased up to the predetermined torque value $T_1$. Accordingly, when the motor rotation decision signal R received from the motor rotation decision circuit 36 indicates that the motor 10 is rotating, the motor fault monitor/control circuit 40 neglects the comparison result signal H supplied from the torque comparison circuit 35 to thereby invalidate the comparing operation thereof.

The clutch control circuit 50 is designed to output a clutch control signal to the electromagnetic clutch 9 for controlling the coupling effort thereof. In more detail, the clutch control signal C is a PWM pulse current signal for driving the electromagnetic clutch 9 with a variable duty cycle so that the coupling effort (i.e., the degree of coupling) of the electromagnetic clutch 9 is controlled in dependence on the width or duration of the PWM current (i.e., duty cycle or ratio. Upon reception of the aforementioned coupling control signal $J_1$ from the motor fault monitor/control circuit 40, the clutch control circuit 50 decreases the width of the PWM pulse current (i.e., the clutch control signal C) progressively and continuously, whereby the coupling effort of the electromagnetic clutch 9 is continuously reduced to the aforementioned predetermined level allowing the steering. Thus, the steering torque T of the steering shaft 2 is caused to decrease down to the predetermined torque value $T_1$. Additionally, the clutch control circuit 50 responds to the coupling control signal $J_2$ supplied from the motor fault monitor/control circuit 40 to thereby increase gradually and continuously the pulse width of the clutch control signal C, as a result of which the coupling effort of the electromagnetic clutch 9 is increased up to the predetermined level $T_1$ mentioned above. As a result of this, the steering torque T of the steering shaft 2 is increased smoothly and continuously to the predetermined torque value $T_1$.

At this juncture, it should be mentioned that the electromagnetic clutch 9 which is controlled in the manner described above may be constituted by an electromagnetic disk clutch having a clutch gap of approximately zero.

Next, operation of the motor-driven power steering control system according to the instant embodiment of the invention will be described.

Figure 5:
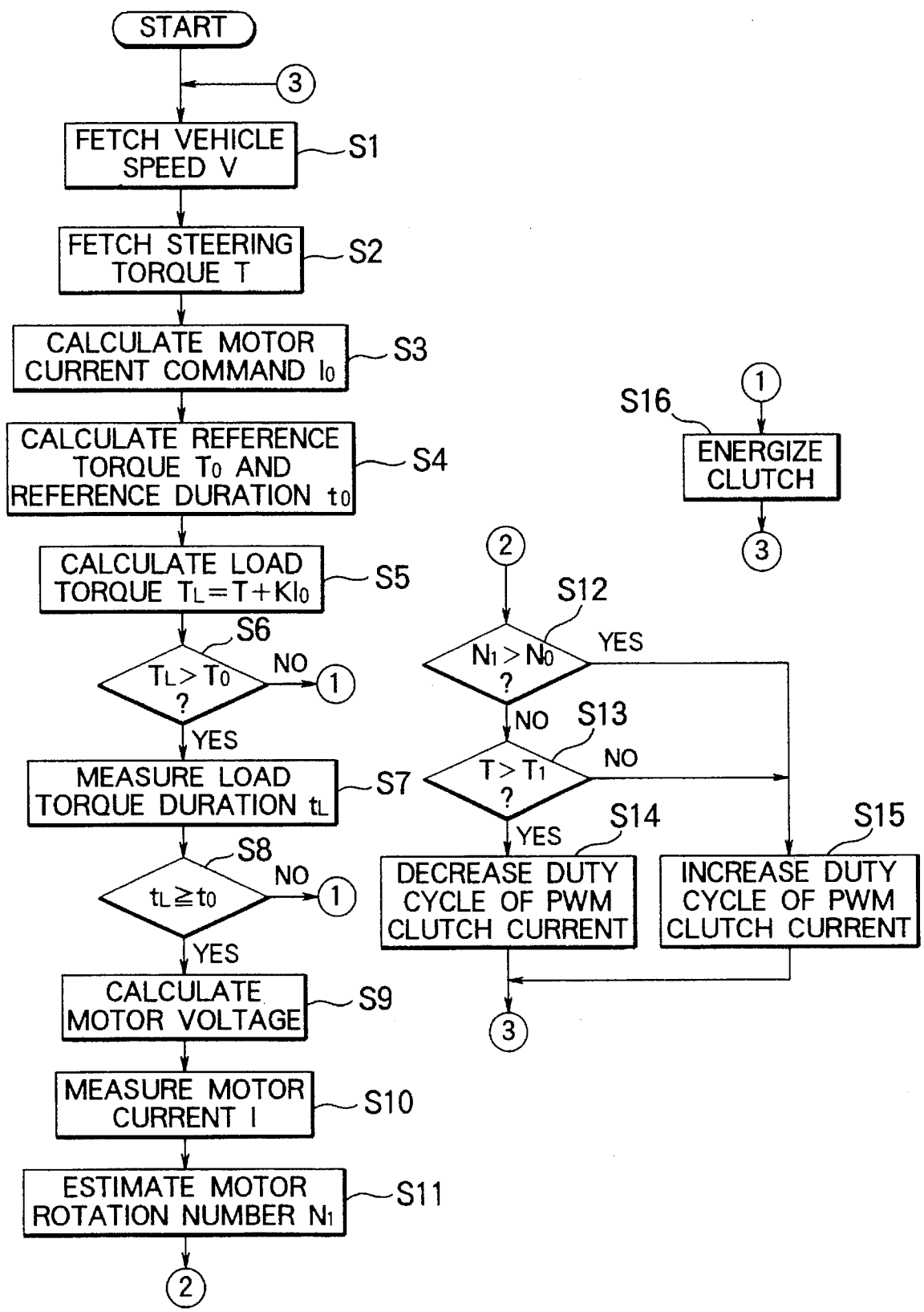
FIG. 5 is a flow chart for illustrating operation of the motor-driven power steering control system according to the first embodiment of the invention.

FIG. 5 is a flow chart for illustrating operation of the motor-driven power steering control system.

Referring to FIG. 2, the vehicle speed V and the steering torque T detected by the vehicle speed sensor 11 and the torque sensor 12, respectively, are fetched to be inputted to the current calculating/driving circuit 21 and the abnormal torque decision reference value calculating circuit 31. Further, the steering torque T is inputted to the load torque calculating circuit 33 in the steps S1 and S2 shown in FIG. 5.

The current calculating/driving circuit 21 generates the motor current command value $I_O$ on the basis of the vehicle speed V and the steering torque T. The motor current command value $I_O$ thus generated is supplied to a switching drive circuit (not shown) employed for driving the motor 10 by way of the motor voltage detection circuit 22 and the motor current detection circuit 23 (step S3 in FIG. 5). The signal indicating the actual motor current I is fed back to the current calculating/driving circuit 21 from the motor side.

On the other hand, the abnormal torque decision reference value calculating circuit 31 responds to the input signal indicating the vehicle speed V to thereby read out the abnormal torque decision reference value $T_O$ and the reference duration $t_O$ corresponding to the vehicle speed V from the memory 32. The abnormal torque decision reference value $T_O$ and the reference duration $t_O$ are then supplied to the torque comparison circuit 35 (step S4 in FIG. 5).

In parallel with the operations mentioned above, the load torque calculating circuit 33 arithmetically determines and generates the decided load torque value $T_L$ indicating a sum of the steering torque T and the motor current command value $I_O$ inputted from the current calculating/driving circuit 21 and multiplied with a scaling factor. The decided load torque value $T_L$ thus determined is transferred to the torque comparison circuit 35 together with the temporal duration $t_L$ (step S5 in FIG. 5).

Upon reception of the abnormal torque decision reference value $T_O$, the reference duration $t_O$, the decided load torque value $T_L$ and the temporal duration $t_L$, the torque comparison circuit 35 compares at first the decided load torque value $T_L$ with the abnormal torque decision reference value $T_O$, whereby the corresponding comparison result signal H is outputted to the motor fault monitor/control circuit 40 (step S6 in FIG. 5).

In response to the comparison result signal H, the motor fault monitor/control circuit 40 checks the content of the comparison result signal H. When the comparison result signal H indicates that the decided load torque value $T_L$ is smaller than the abnormal torque decision reference value $T_O$, it is then decided that the motor 10 is normal (i.e., the motor is neither locked nor nearly locked), whereby the coupling control signal J is supplied to the clutch control circuit 50 for maintaining the electromagnetic clutch 9 in the fully energized state. In the flow chart of FIG. 5, when the step S6 results in negation "NO", the step S16 is executed.

On the contrary, when the comparison result signal H indicates that the decided load torque value $T_L$ is not smaller than the abnormal torque decision reference value $T_O$, it is then decided that the motor 10 is in the locked or nearly locked state. In this case, the temporal duration $t_L$ indicated by the comparison result signal H which satisfies the condition that $T_L > T_O$ is checked, and comparison in magnitude is made between the temporal duration $t_L$ and the reference duration $t_O$. In the flow chart of FIG. 5, when the decision step S6 results in affirmation "YES", steps S7 and S8 are executed.

In case the comparison result signal H indicates that the temporal duration $t_L$ does not exceed the reference duration $t_O$, it is then regarded that the motor 10 operates normally without falling into the locked or nearly locked state. Thus, the coupling control signal J is supplied to the clutch control circuit 50 for maintaining the electromagnetic clutch 9 in the fully energized state. (In FIG. 5, when the answer of a decision step S8 is negative "NO", the step S16 is executed.)

In contrast, when the comparison result signal H indicates that the temporal duration $t_L$ is equal to or longer than the reference duration $t_O$, this means that the motor 10 is in the locked or nearly locked state. In this case, the motor rotation decision circuit 36 makes a decision as to whether or not the motor 10 is rotating. More specifically, the motor rotation decision circuit 36 estimates a rotational frequency $N_1$ of the motor 10 on the basis of the voltage appearing across the motor 10 as detected by the motor voltage detection circuit 22 and the actual motor current I detected by the motor current detection circuit 23. (In FIG. 5, when the answer of a decision step S8 is affirmative "YES", steps S9 to S11 are executed.)

Thereafter, the motor rotation number $N_1$ is compared with a reference motor rotation number $N_0$ (e.g. zero). When the motor rotation number $N_1$ is greater than the reference motor rotation number $N_0$, the motor rotation decision signal R indicating that the motor 10 is rotating is supplied to the motor fault monitor/control circuit 40. On the other hand, unless the motor rotation number $N_1$ exceeds the reference motor rotation number $N_0$, the motor rotation decision signal R indicating no rotation of the motor 10 is inputted to the motor fault monitor/control circuit 40 (step S12 in FIG. 5).

When the motor rotation decision signal R is inputted to the motor fault monitor/control circuit 40, the latter checks the content of this signal R. When the signal R indicates that the motor 10 is rotating, it is then decided that the motor 10 is operating normally, whereby the coupling control signal $J_2$ is supplied to the clutch control circuit 50. In the flow chart of FIG. 5, if the decision step S12 results in an affirmation "YES" the motor fault monitor/control circuit 40 neglects the comparison result signal H supplied from the torque comparison circuit 35 to invalidate the comparing operation thereof.

Upon reception of the coupling control signal $J_2$ from the motor fault monitor/control circuit 40, the clutch control circuit 50 increases gradually and continuously the pulse width of the PWM clutch control signal C which is supplied to the electromagnetic clutch 9 (step S15 in FIG. 5). In this conjunction, it should be recalled that the electromagnetic clutch 9 is constituted by a disk-type electromagnetic clutch having a gap of substantially zero. Accordingly, the electromagnetic clutch 9 is not instantaneously turned on in response to the clutch control signal C but the coupling effort thereof is increased up to the predetermined level mentioned previously, which results in that the steering torque T of the steering shaft 2 is increased to the predetermined torque value $T_1$. In other words, the electromagnetic clutch 9 is smoothly shifted from a partially energized state (semi-clutch state) to a fully energized state.

On the contrary, when the motor rotation decision signal R indicates no rotation of the motor 10, it is then decided that the motor 10 is in the locked or nearly locked state. Then, the decision part 41 incorporated in the motor fault monitor/control circuit 40 compares the steering torque T with the predetermined torque value $T_1$. (In FIG. 5, when the decision step S12 results in negation "NO", a step S13 is executed.)

When the decision part 41 decides that the steering torque T is smaller than the predetermined torque value $T_1$, the motor fault monitor/control circuit 40 issues the coupling control signal $J_2$ to the clutch control circuit 50. (In FIG. 5, when the answer of decision step S13 is negative "NO", a step S15 is executed.)

Thus, the pulse width (or duty cycle) of the clutch control signal C supplied to the electromagnetic clutch 9 from the clutch control circuit 50 is gradually and continuously increased (step S15 in FIG. 5), whereby the coupling effort of the electromagnetic clutch 9 is increased to the predetermined level, resulting in that the steering torque T of the steering shaft 2 is increased up to the predetermined torque value $T_1$.

Namely, when it is decided that the motor 10 is not rotating but in the locked or nearly locked state and when the electromagnetic clutch 9 is in the disconnected state, as indicated by the steering torque T which is smaller than the predetermined torque value $T_1$ (when $T<T_1$ in a step S13 in FIG. 5), the coupling effort of the electromagnetic clutch 9 is strengthened to be set to the semi-clutch (semi-coupling) state in which some part of the assist torque generated by the motor 10 is transmitted to the steering shaft 2 for thereby assisting the driver in the manipulation of the steering wheel 1.

Further, when it is decided by the decision part 41 that the steering torque T is greater than the predetermined torque value $T_1$ (i.e., when the answer of the step S13 is affirmative "YES"), the coupling control signal $J_1$ is supplied to the clutch control circuit 50, which signal $J_1$ is effective to decrease smoothly and continuously the coupling effort of the electromagnetic clutch 9 to the predetermined level for lowering the steering torque T of the steering shaft 2 to the predetermined torque value $T_1$.

In this way, when the coupling control signal $J_1$ is supplied to the clutch control circuit 50 from the motor fault monitor/control circuit 40, the pulse width of the clutch control signal C supplied to the electromagnetic clutch 9 from the clutch control circuit 50 is reduced gradually and continuously (step S14 in FIG. 5). In other words, when the clutch control signal C is supplied to the electromagnetic clutch 9, the coupling effort of the electromagnetic clutch 9 is continuously lowered to the predetermined level mentioned previously without the electromagnetic clutch 9 being disconnected, as a result of which the steering torque T of the steering shaft 2 is lowered to the predetermined torque value $T_1$.

More specifically, in case the electromagnetic clutch 9 is in the sufficiently coupled state, the motor 10 is locked or nearly locked and the steering torque T is greater than the abnormal torque decision reference value $T_O$ (i.e., when $T>T_1$ in the step S13 in FIG. 5), the coupling effort of the electromagnetic clutch 9 is reduced to set the electromagnetic clutch 9 to the semi-coupled or half-clutch state for facilitating the steering of the steering wheel 1 by the driver.

Figure 13:
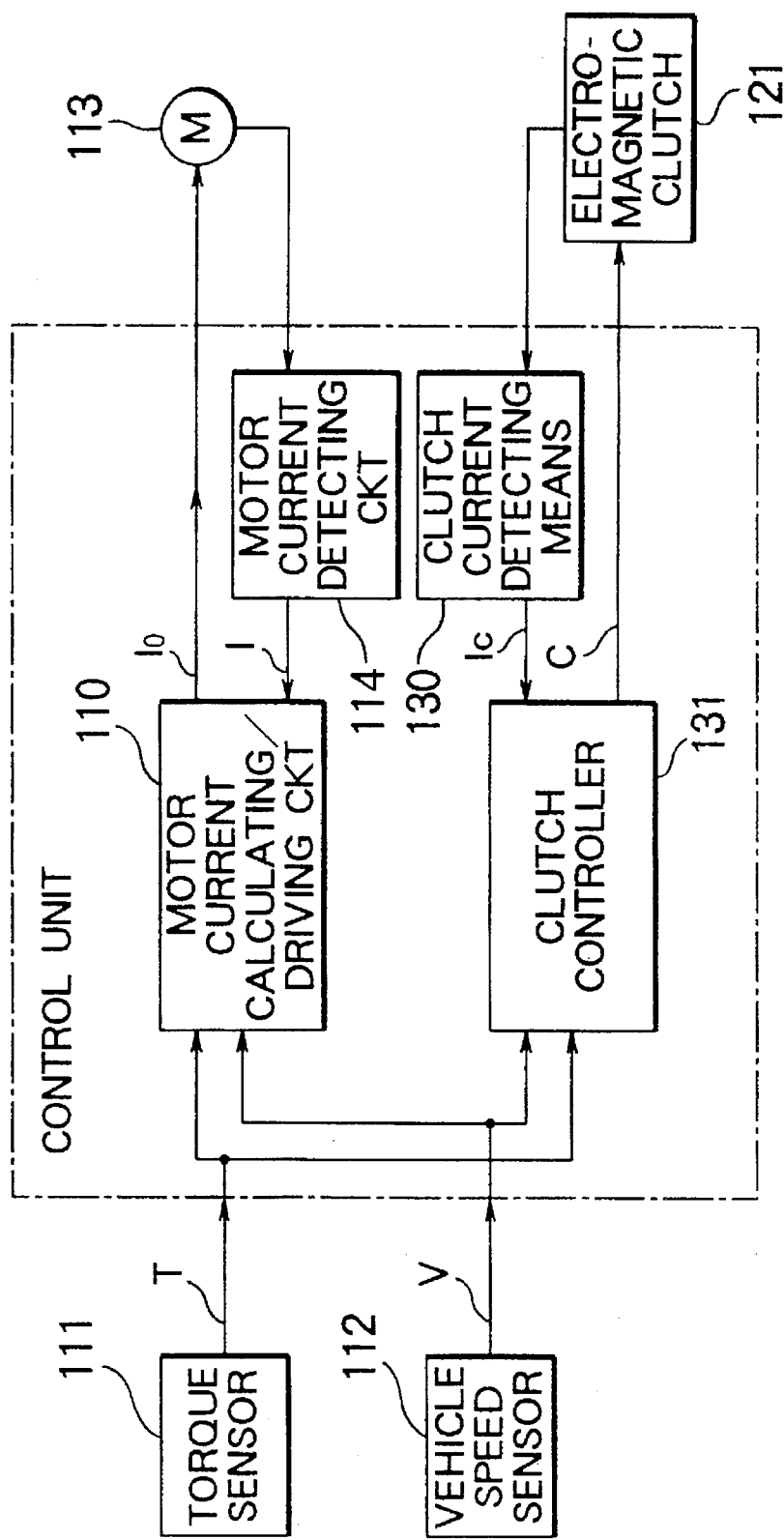
FIG. 13 is a block diagram showing yet another motor-driven power steering control system known heretofore.
Figure 14:
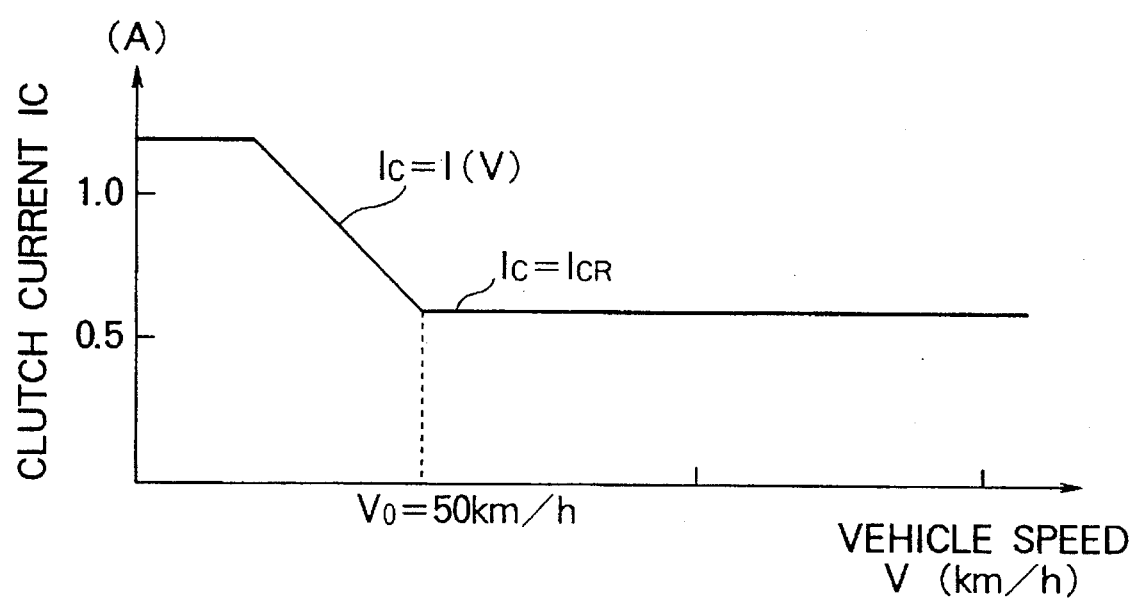
FIG. 14 is a waveform diagram showing a clutch current controlled in the apparatus shown in FIG. 13.

As is apparent from the foregoing, when the decided load torque value $T_L$ is determined to be greater than the abnormal torque decision reference value $T_O$, the electromagnetic clutch 9 is set to a semi-coupling state (half-clutch state) through the control processing of high accuracy, as described above, whereby the steering wheel 1 is prevented from falling into the locked or nearly locked state. Thus, easy manipulation of the steering wheel 1 can be ensured. Besides, because the semi-coupling state of the electromagnetic clutch 9 is realized in a continuous manner, there can take place neither slip of the electromagnetic clutch 9 nor generation of noise and shock, which contributes to improvement of the environmental condition for operation of the vehicle. Further, because no special clutch current detecting means 130 of complicated circuit configuration for executing the requisite processing with high accuracy is required in the motor-driven power steering system according to the instant embodiment of the invention, differing from the prior art system shown in FIG. 13, the control apparatus can be implemented in a simplified structure with the manufacturing cost being significantly reduced.

In the foregoing description of the embodiment, both the comparison of the decided load torque value $T_L$ with the abnormal torque decision reference value $T_O$ and that of the temporal duration $t_L$ with the reference duration $t_O$ are effected. However, the invention is never restricted to such scheme. By way of example, only the comparison of the decided load torque value $T_L$ with the abnormal torque decision reference value $T_O$ may be performed by the torque comparison circuit 35 to substantially same effect. In that case, the step S8 shown in FIG. 5 can be spared.

Further, although the reference duration $t_O$ is previously set to a single value in the abnormal torque decision reference value calculating circuit 31, it should be appreciated that two or more values may be preset for the reference duration $t_O$. By way of example, two values of "0.2 second" and "0.4 second" may previously set for the reference duration $t_O$, and the corresponding abnormal torque decision reference values $T_O$ may be read out from the memory 32. Thus, when the reference duration $t_O$ is 0.2 second, the corresponding abnormal torque decision reference value $T_O$ may be 4 kgf·cm, 110 kgf·cm and 170 kgf·cm, respectively, while for the reference duration $t_O$ of 0.4 second, the corresponding values of the abnormal torque decision reference value $T_O$ may be 39 kgf·cm and 100 kgf·cm, respectively, as can be seen from FIG. 3. Accordingly, when these abnormal torque decision reference values $T_O$ are related to the vehicle speed V, the abnormal torque decision reference value $T_O$ assumes 170 kgf·cm, 110 kgf·cm and 40 kgf·cm at the vehicle speeds of 60 km/h, 80 km/h and 100 km/h when the reference duration $t_O$ is 0.2 second, while when the reference duration $t_O$ is 0.4 second, the abnormal torque decision reference value $T_O$ takes on values of 100 kgf·cm and 39 kgf·cm at the vehicle speeds V of 60 km/h and 80 km/h, respectively, as is illustrated in FIG. 4.

In the torque comparison circuit 35, the comparison of the decided load torque value $T_L$ with the abnormal torque decision reference value $T_O$ as well as the comparison of the temporal duration $t_L$ with the reference duration $t_O$ is performed for each value of the temporal durations $t_L$. By way of example, when the vehicle speed V is 60 km/h, comparisons or decisions are made to determine whether the conditions "$T_L>170$ and $t_L>0.2$" or "$T_L>100$ and $t_L \geq 0.4$" are satisfied. When either one of the conditions mentioned above is met, it is then decided by the motor fault monitor/control circuit 40 that the motor 10 is in the locked or nearly locked state. In this way, the decision processing for determining the state of the motor 10 can be realized more finely.

Embodiment 2

Next, description will be directed to a second embodiment of the invention.

Figure 6:
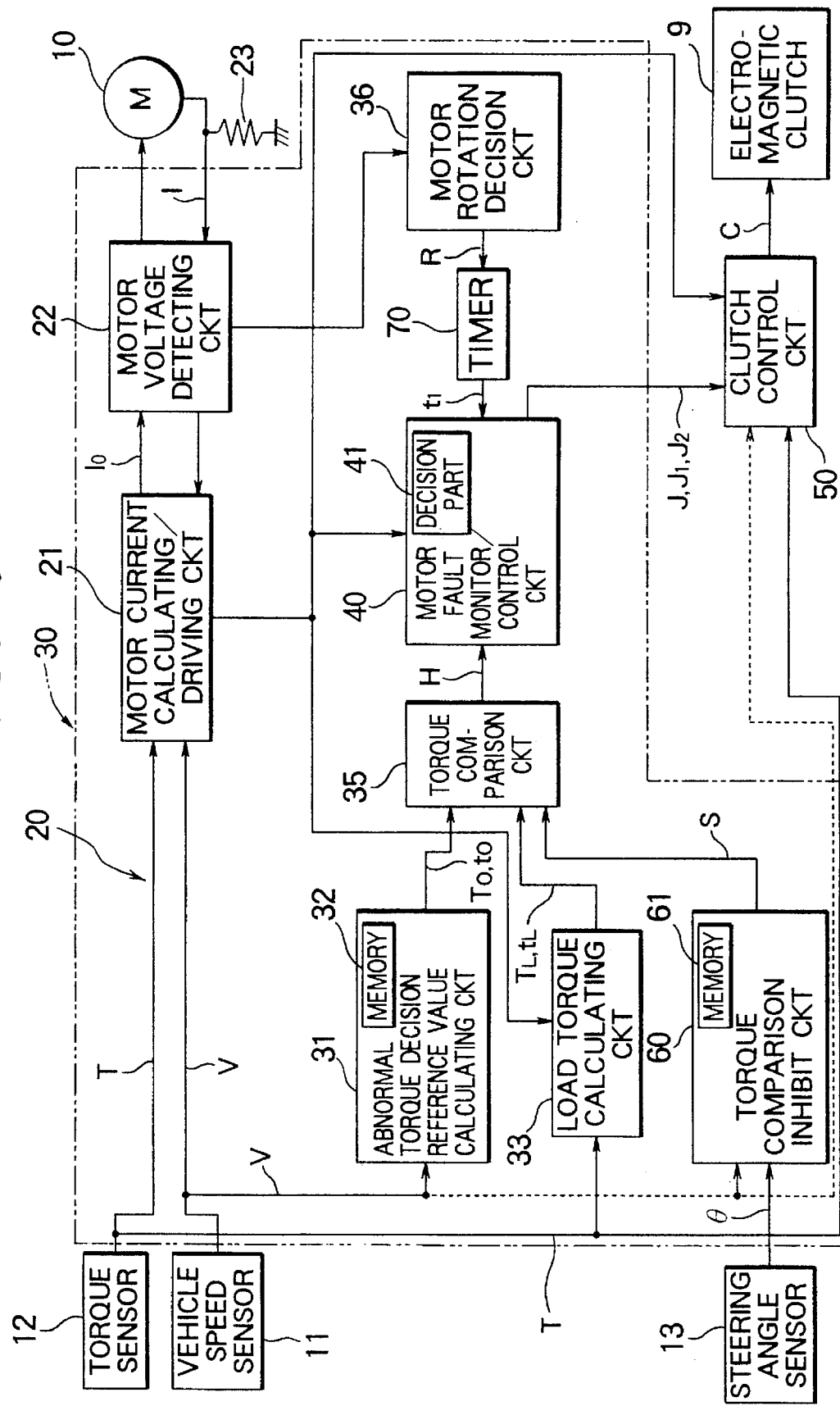
FIG. 6 is a block diagram showing a structure of a control apparatus for a motor-driven power steering system according to a second embodiment of the invention.

This embodiment differs from the first embodiment in that a torque comparison inhibiting circuit is provided as the torque comparison inhibiting means for the purpose of evading erroneous decision. FIG. 6 is a block diagram showing a structure of a control apparatus for a motor-driven power steering control system according to the second embodiment of the invention. In this figure, components the same as or equivalent to those shown in FIG. 2 are denoted by like reference symbols.

As shown in FIG. 6, a steering angle sensor 13 is provided in association with the steering shaft 2 as a steering angle detecting means for detecting an angle θ for which the steering wheel 1 is manipulated. The signal indicating the angle θ of steering (referred to as the steering angle) is supplied to the control apparatus 20 which incorporates a torque comparison inhibiting circuit 60 as a part of the central processing unit 30 for preventing erroneous decision by making use of the steering angle θ.

The torque comparison inhibiting circuit 60 includes a memory 61 as a steering angle recording means for storing reference steering angles preset in correspondence to vehicle speeds, respectively.

More specifically, the memory 61 which is constituted by a ROM stores therein in the form of a table the reference vehicle speeds $V_O$ and the reference steering angles $\theta_O$ representing approximately maximum angles for which the steering shaft is allowed to rotate at the reference vehicle speeds $V_O$, respectively, on the condition that the motor 10 is operating normally, i.e., unless the motor 10 is in the locked or nearly locked state.

The torque comparison inhibiting circuit 60 is supplied with the signal indicating the actual vehicle speed V from the vehicle speed sensor 11. Upon reception of the signal indicating the vehicle speed V, the torque comparison inhibiting circuit 60 reads out from the memory 61 the reference steering angle $\theta_O$ corresponding to the reference vehicle speed $V_O$ which coincides with the vehicle speed V as inputted and compares the steering angle θ supplied from the steering angle sensor 13 with the reference steering angle $\theta_O$ as read out. When the steering angle θ is greater than the reference steering angle $\theta_O$, a decision is made that the motor 10 is operating normally, i.e., the motor 10 is not in the locked or nearly locked state, and a comparison inhibiting signal is sent to the torque comparison circuit 35 for stopping the comparing operation thereof.

Interposed between the motor rotation decision circuit 36 and the motor fault monitor/control circuit 40 is a timer 70 which serves to output a time signal $t_1$ to the motor fault monitor/control circuit 40 in response to the motor rotation decision signal R supplied from the motor rotation decision circuit 36. More specifically, upon inputting of the motor rotation decision signal R indicating that the motor 10 is rotating, the timer 70 starts a time measuring or counting operation for a predetermined period (e.g. one second). As the time lapses from the start of the time counting operation, the timer 70 generates the time signal $t_1$ representing the time count which is decremented as a function of the time lapse. The time signal $t_1$ is supplied to the motor fault monitor/control circuit 40, which then checks the time signal $t_1$ and performs the various processings described previously in conjunction with the first embodiment when the time signal $t_1$ indicates the time count of zero. If otherwise, the motor fault monitor/control circuit 40 outputs the coupling control signal J to the clutch control circuit 50 for maintaining the electromagnetic clutch 9 in the fully energized state.

Next, description will turn to operation of the apparatus described above.

Figure 8:
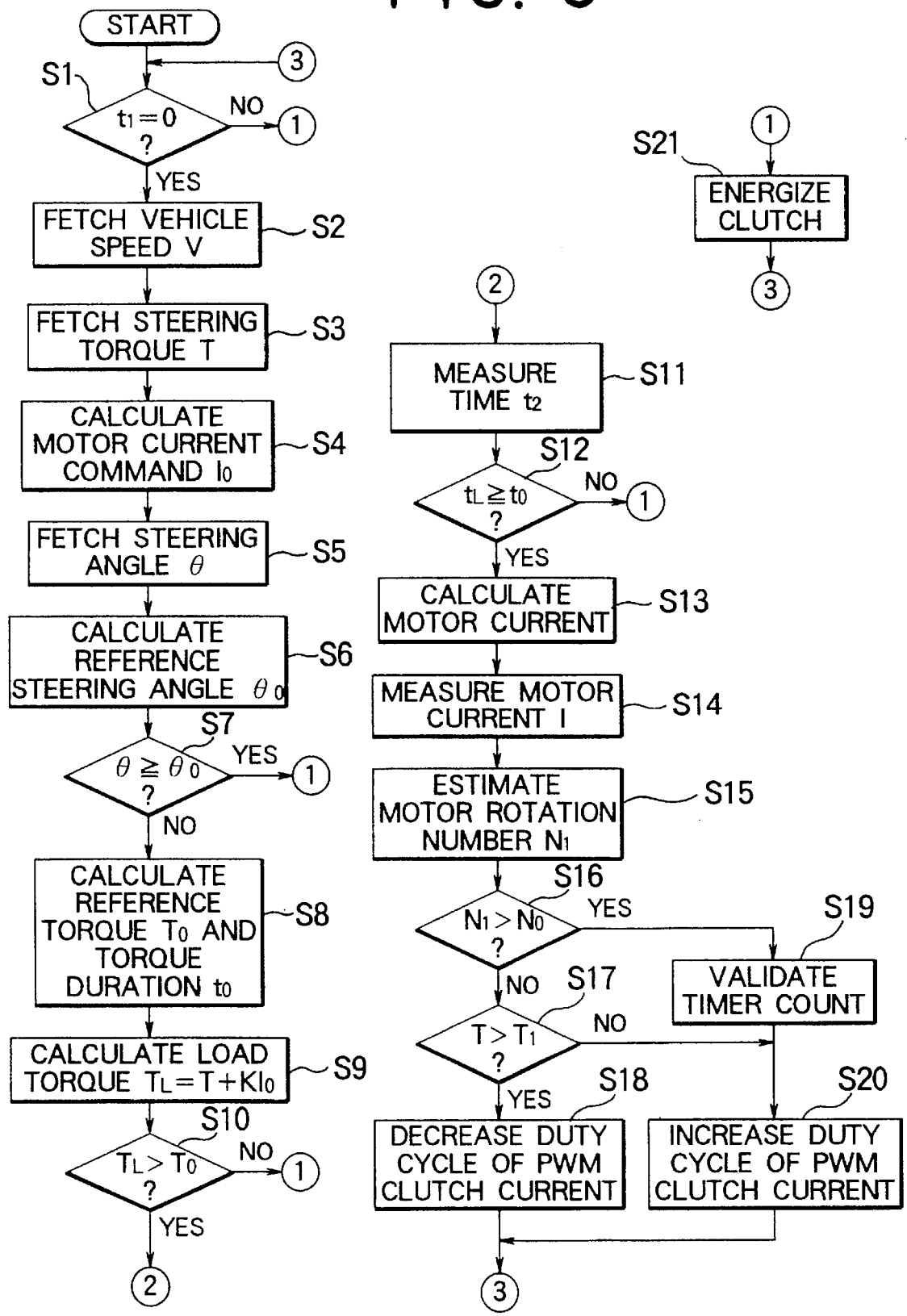
FIG. 8 is a flow chart for illustrating operation of the control apparatus according to the second embodiment of the invention.
Figure 9:
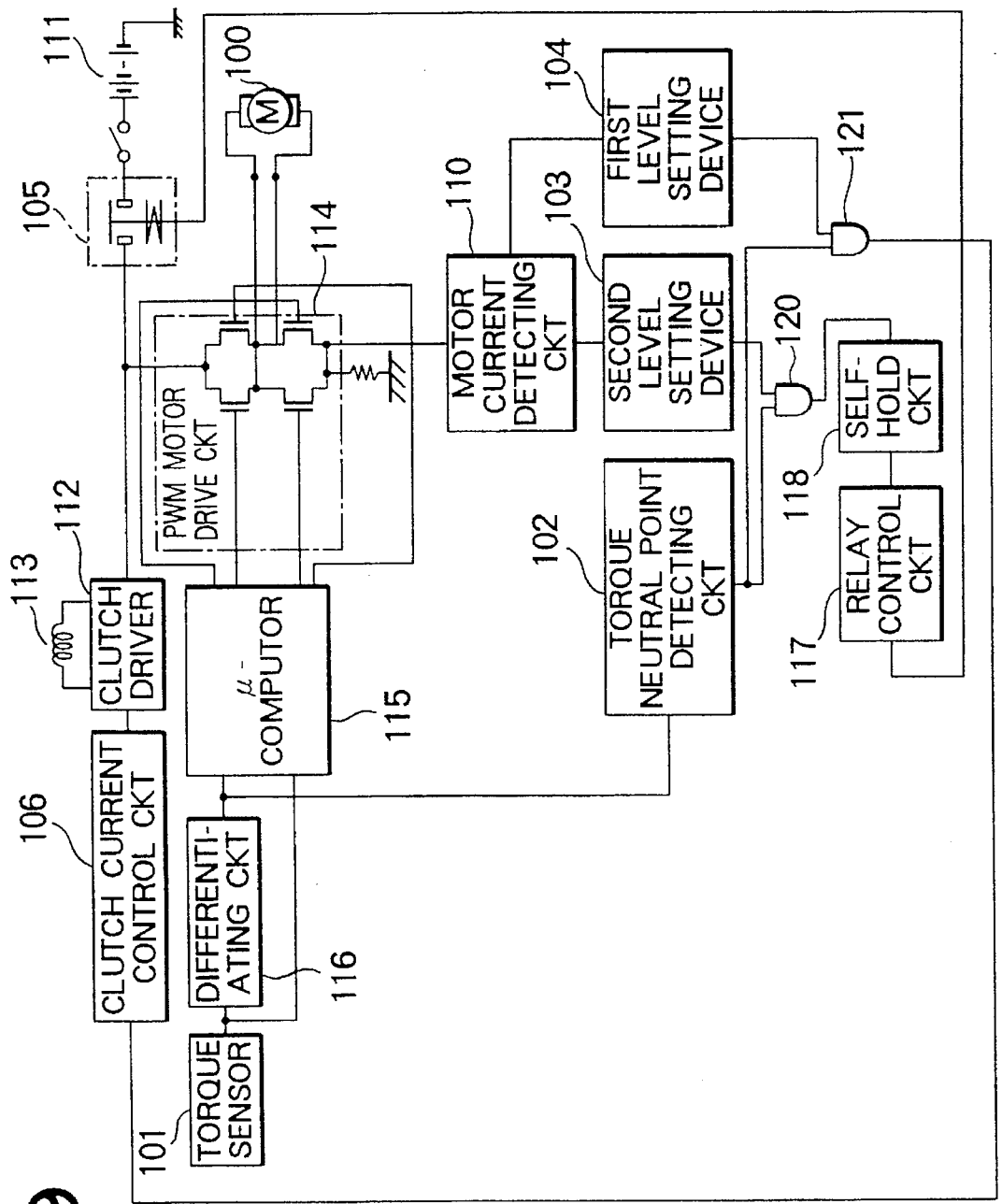
FIG. 9 is a block diagram showing a structure of a motor-driven power steering control system known heretofore.
Figure 10:
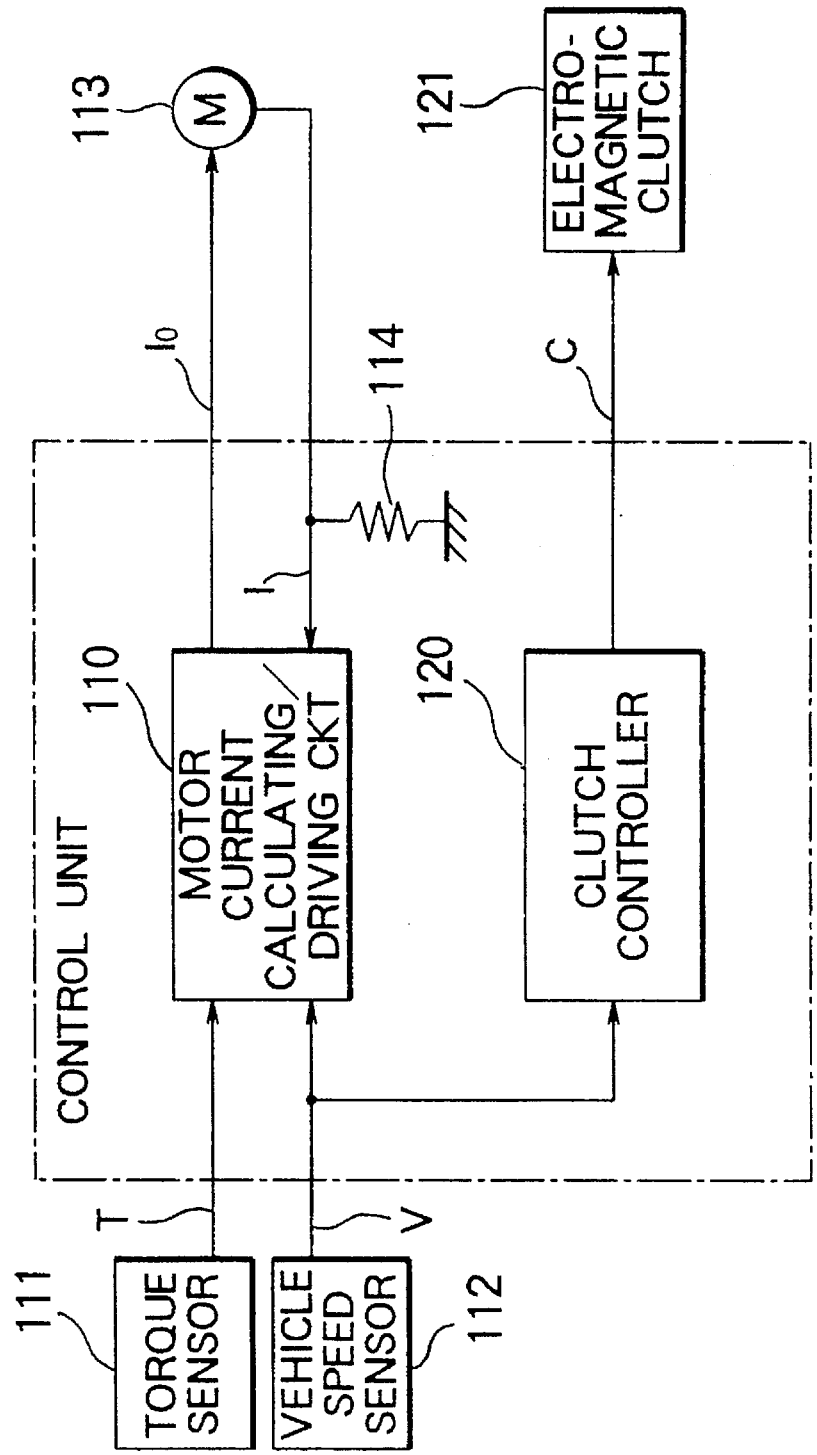
FIG. 10 is a block diagram showing another motor-driven power steering control system known heretofore.
Figure 11:
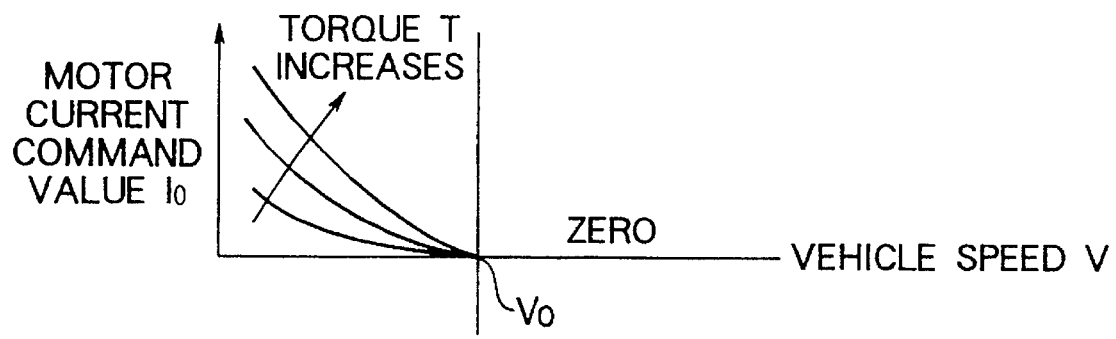
FIG. 11 is a waveform diagram for illustrating a relation between motor current command value and a vehicle speed.
Figure 12:
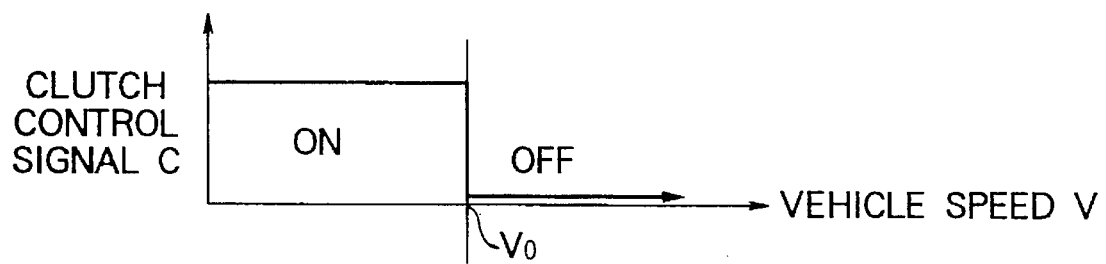
FIG. 12 is a waveform diagram for illustrating relation between a control signal of an electromagnetic clutch and a vehicle speed signal in the control apparatus shown in FIG. 10.

FIG. 8 is a flow chart for illustrating operation of the control apparatus according to the second embodiment of the invention.

When the time signal $t_1$ supplied from the timer 70 is not zero, it is decided by the motor fault monitor/control circuit 40 that the predetermined time mentioned previously has not yet lapsed as of the time point when the decision was made that the motor 10 was normal. Accordingly, the motor fault monitor/control circuit 40 supplies the coupling control signal J to the clutch control circuit 50 for maintaining the current state of the electromagnetic clutch 9. (In the flow chart, when a decision step S1 results in "NO", a step S21 is executed.)

On the contrary, when the time signal $t_1$ outputted from the timer 70 is zero, this means that the aforementioned predetermined time has lapsed since the decision of the motor 10 being normal and that there exists a possibility of the motor 10 having fallen into the locked or nearly locked state. Accordingly, the processing operations similar to those of the steps S1 to S3 shown in FIG. 5 are performed. (In FIG. 8, when the decision step S1 results in "YES", steps S2 to S4 are executed.)

Thereafter, the torque comparison inhibiting circuit 60 performs the erroneous decision preventing processing based on the vehicle speed V detected by the vehicle speed sensor 11. More specifically, in the torque comparison inhibiting circuit 60, the reference steering angle $\theta_O$ corresponding to the reference vehicle speed $V_O$ which coincides with the vehicle speed V as detected is read out from the memory 61, which is followed by comparison of the reference steering angle $\theta_O$ with that derived from the output of the steering angle sensor 13. (In the flow chart shown in FIG. 8, steps S5 to S7 are executed.)

When the steering angle $\theta$ as inputted is equal to or greater than the reference steering angle $\theta_O$, it is then decided that the motor 10 is neither in the locked state nor in the nearly locked state, whereby the comparison inhibiting signal S for stopping the comparing operation of the torque comparison circuit 35 is outputted to the torque comparison circuit 35. As a result of this, the coupling control signal J for maintaining the electromagnetic clutch 9 in the fully energized state is supplied to the clutch control circuit 50 from the motor fault monitor/control circuit 40. (In the flow chart of FIG. 8, when the decision step S7 results in "YES", the step S21 is executed.)

Namely, the steering angle $\theta$ which is equal to or greater than the reference steering angle $\theta_O$ indicates explicitly that the motor 10 is normal. In this case, the succeeding operations are stopped to evade positively the possibility of the motor 10 being erroneously decided as being abnormal.

On the contrary, the steering angle $\theta$ which is smaller than $\theta_O$ indicates explicitly that there exists a possibility of the motor 10 being in the locked or nearly locked state. Accordingly, the processing operations similar to those executed in the steps S4 to S16 shown in FIG. 5 are executed. (In FIG. 8, steps S8 to S18 and S20 are executed.)

When the motor rotation decision signal R indicating that the motor 10 is rotating is applied to the timer 70 from the motor rotation decision circuit 36, the timer 70 is reset with the time signal $t_1$ being inputted to the motor fault monitor/control circuit 40, whereon the processings similar to those described above are executed.

Figure 7:
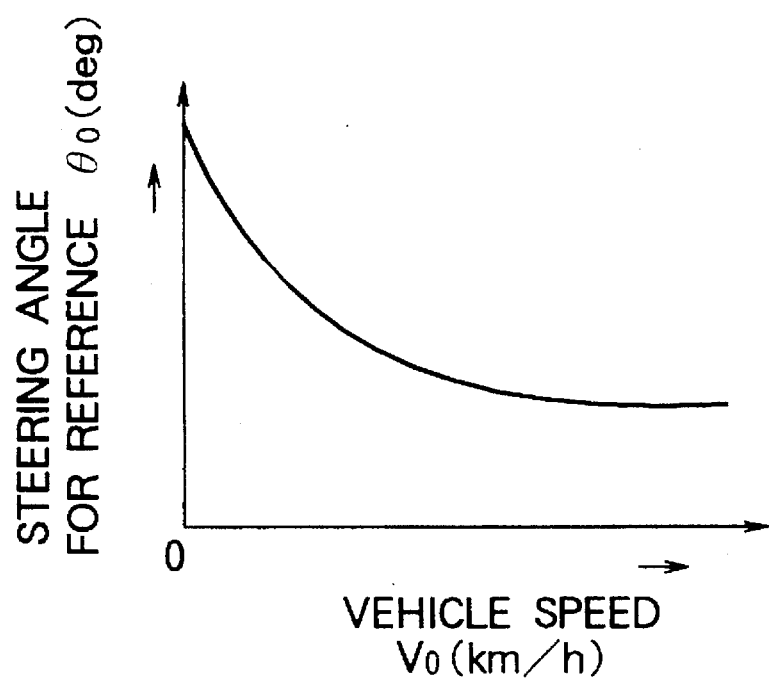
FIG. 7 is a view showing relations between vehicle speeds and reference steering angles employed in effecting the control by the apparatus shown in FIG. 6.

Although it has been described that the reference vehicle speeds $V_O$ and the steering angles $\theta_O$ are stored in the memory 61 shown in FIG. 7 in the form of a continuous curve, wherein the vehicle speed V is read out from the memory 61 by the torque comparison inhibiting circuit 60 to perform comparison of the reference steering angle $\theta_O$ with the steering angle $\theta$ derived from the output of the steering angle sensor 13, the invention is not limited to such arrangement.

By way of example, the reference steering angle $\theta_O$ may be set at a predetermined constant value independent of the vehicle speed V without using the memory 61, wherein the steering angle $\theta$ may be compared with the reference steering angle $\theta_O$ in the torque comparison inhibiting circuit 60.

Besides, the steering angle sensor 13 may also be spared. In that case, the reference vehicle speed $V_O$ is previously set at a constant value, wherein the vehicle speed V derived from the output of the vehicle speed sensor 11 is compared with the reference vehicle speed $V_O$ to thereby apply the comparison inhibiting signal S to the torque comparison circuit 35 from the torque comparison inhibiting circuit 60 unless the vehicle speed V is higher than the reference vehicle speed $V_O$.

Since the second embodiment is similar to the first embodiment in other respects concerning the structure and operations, any further description will be unnecessary.

Many features and advantages of the present invention are apparent form the detailed specification and thus it is intended by the appended claims to cover all such features and advantages of the system which fall within the true spirit and scope of the invention. Further, since numerous modifications and changes will readily occur to those skilled in the art, it is not desired to limit the invention to the exact construction and operation illustrated and described. By way of example, although it has been described that the electromagnetic clutch 9 is constituted by a disk-type one, it should be appreciated that any type electromagnetic clutch may be employed so far as the torque transmitted thereby can be controlled continuously. Further, it goes without saying that the control methods described previously by reference to the flow charts can be realized by a correspondingly programmed microcomputer, which thus falls within the purview of the invention. Accordingly, all suitable modifications and equivalents may be resorted to, falling within the scope of the invention.

We claim:

1. In a motor-driven power steering system of a motor vehicle which includes a steering mechanism for steering said motor vehicle, an electric motor for generating an assist torque to be applied to said steering mechanism for facilitating steering operation of said motor vehicle, and electromagnetic clutch means for transmitting said assist torque to said steering mechanism, said electromagnetic clutch means being of such a type that a magnitude of a coupling effort thereof can continuously and controllably be changed at least over a range from a partially energized state of said electromagnetic clutch means to a fully energized state thereof, wherein in said fully energized state of said electromagnetic clutch means, said assist torque generated by said motor is transmitted to said steering mechanism at a maximum level, while in said partially energized state of said electromagnetic clutch means, the transmission of said assist torque to said steering mechanism is limited to such an extent that said steering mechanism can manually be manipulated independent of the state of said electric motor;

an apparatus for controlling said electromagnetic clutch means, comprising:
      clutch control means adapted for controlling said coupling effort of said electromagnetic clutch means over said range;
      abnormal torque detecting means for detecting an abnormally large torque applied to said steering mechanism, to thereby output an abnormal torque detection signal;
      motor fault monitor/control means operatively connected to said abnormal torque detecting means and responsive to said abnormal torque detection signal for thereby causing said clutch control means to control said electromagnetic clutch means so that said electrical energization of said electromagnetic clutch means is continuously decreased to a level corresponding to said partially energized state, and
      motor rotation decision means for deciding whether or not a current rotation number of said motor is greater than a predetermined value;
      wherein when said current rotation number of said motor is greater than said predetermined value, said motor rotation decision means generates an invalidation signal, and said motor fault monitor/control means, in response to said invalidation signal, controls operation of said clutch control means so as to inhibit said electrical energization of said electromagnetic clutch means from being decreased notwithstanding said abnormal torque detection signal.

2. A control apparatus according to claim 1,
   wherein said clutch control means is so arranged as to supply a pulse width modulated current for electrically energizing said electromagnetic clutch means, and wherein duty cycle of said pulse width modulated current is linearly changed in response to said abnormal torque detection signal.

3. A control apparatus according to claim 1, wherein when said current rotation number of said motor is not greater than said predetermined value, said motor fault monitor/control means controls said clutch control means so as to increase continuously the coupling effort of said electromagnetic clutch means at least to a level corresponding to said electrically partially energized state while neglecting said abnormal torque detection signal.

4. A control apparatus according to claim 1, wherein said predetermined value is substantially zero.

5. A control apparatus according to claim 1, further comprising:

time measuring means for measuring a duration for which said rotation number of said motor remains continuously greater than said predetermined value for thereby generating a corresponding time signal; and decision means incorporated in said motor fault monitor/control means for deciding on the basis of said time signal whether said duration is greater than a threshold value;

wherein when said current rotation number of said motor is greater than said predetermined value and when said duration is greater than said threshold value, said motor fault monitor/control means controls operation of said clutch control means so as to inhibit said electrical energization of said electromagnetic clutch means from being decreased notwithstanding said abnormal torque detection signal.

6. A control apparatus according to claim 1, further comprising:

steering angle detection means for detecting an angle of steering of said steering mechanism; and steering angle comparison means for comparing said steering angle detected by said steering angle detection means with a predetermined steering angle;

wherein when said detected steering angle is greater than said predetermined steering angle, said steering angle comparison means generates an invalidation signal, and said motor fault monitor/control means, in response to said invalidation signal from said steering angle comparison means, controls operation of said clutch control means so as to inhibit said electrical energization of said electromagnetic clutch means from being decreased regardless of said abnormal torque detection signal, and wherein when said current rotation number of said motor is greater than said predetermined value and when said detected steering angle is greater than said predetermined angle, said motor fault monitor/control means controls operation of said clutch control means so as to inhibit said electrical energization of said electromagnetic clutch means from being decreased regardless of said abnormal torque detection signal.

7. A control apparatus according to claim 6, further comprising:

time measuring means for measuring a duration for which said rotation number of said motor remains continuously greater than said predetermined value for thereby generating a corresponding time signal; and decision means incorporated in said motor fault monitor/control means for deciding on the basis of said time signal whether said duration is greater than a threshold value;

wherein when said detected steering angle is greater than said predetermined steering angle and when said duration is greater than said threshold value, said motor fault monitor/control means controls operation of said clutch control means so as to inhibit said electrical energization of said electromagnetic clutch means from being decreased notwithstanding said abnormal torque detection signal.

8. In a motor-driven power steering system of a motor vehicle which includes a steering mechanism for steering said motor vehicle, an electric motor for generating an assist torque to be applied to said steering mechanism for facilitating steering operation of said motor vehicle, and electromagnetic clutch means for transmitting said assist torque to said steering mechanism, said electromagnetic clutch means being of such a type that a magnitude of a coupling effort thereof can continuously and controllably be changed at least over a range from a partially energized state of said electromagnetic clutch means to a fully energized state thereof, wherein in said fully energized state of said electromagnetic clutch means, said assist torque generated by said motor is transmitted to said steering mechanism at a maximum level, while in said partially energized state of said electromagnetic clutch means, the transmission of said assist torque to said steering mechanism is limited to such an extent that said steering mechanism can manually be manipulated independent of the state of said electric motor;

an apparatus for controlling said electromagnetic clutch means, comprising:

clutch control means adapted for controlling said coupling effort of said electromagnetic clutch means over said range;

abnormal torque detecting means for detecting an abnormally large torque applied to said steering mechanism, to thereby output an abnormal torque detection signal;

motor fault monitor/control means operatively connected to said abnormal torque detecting means and responsive to said abnormal torque detection signal for thereby causing said clutch control means to control said electromagnetic clutch means so that said electrical energization of said electromagnetic clutch means is continuously decreased to a level corresponding to said partially energized state, vehicle speed detecting means for detecting a speed of said motor vehicle to generate a vehicle speed detection signal;

steering torque detecting means for detecting a steering torque applied to said steering mechanism to generate a steering torque detection signal;

reference torque value storing means (32) for storing reference torque values determined previously in correspondence to predetermined vehicle speeds, respectively;

reference torque value decision means responsive to said vehicle speed signal to thereby read out from said reference torque value storing means one of said reference torque values which corresponds to a vehicle speed indicated by said vehicle speed detection signal;

motor current detecting means for detecting a motor current flowing through said electric motor to generate a motor current signal;

load torque arithmetic means for determining a load torque acting on said steering system on the basis of said steering torque detection signal and said motor current signal to thereby generate a load torque signal; and comparison means for comparing said load torque with said reference torque value read out from said reference torque value storing means to thereby output said abnormal torque detection signal when said load torque exceeds said reference torque value;

wherein said motor fault monitor/control means responds to said abnormal torque detection signal for controlling said electromagnetic clutch means so that said electrical energization of said electromagnetic clutch means is continuously decreased to a level corresponding to said electrically partially energized state.

9. A control apparatus according to claim 8, wherein said clutch control means is so arranged as to supply a pulse width modulated current for electrically energizing said electromagnetic clutch means to thereby control continuously the coupling effort of said electromagnetic clutch means in dependence on at least one of said steering torque detection signal and said vehicle speed signal and in response to said abnormal torque detection signal by controlling duty cycle of said pulse width modulated current.

10. A control apparatus according to claim 8, said abnormal torque detecting means further including:

reference torque duration storing means for storing reference torque durations determined previously in correspondence to predetermined vehicle speeds, respectively;

reference torque duration decision means responsive to said vehicle speed signal to thereby read out from said reference torque duration storing means one of said reference torque durations which corresponds to said vehicle speed indicated by said vehicle speed detection signal; and load torque duration arithmetic means for determining a duration of said load torque on the basis of said steering torque detection signal and said motor current flowing through said motor to generate a load torque duration signal;

wherein said comparison means compares said load torque with a reference torque value $T_O$ read out from said reference torque value storing means while comparing said load torque duration signal outputted from said load torque duration arithmetic means with said reference torque duration outputted from said reference torque duration decision means, to thereby output said abnormal torque signal when said load torque exceeds said reference torque value and when said duration of said load torque exceeds said reference torque duration outputted from said reference torque duration decision means.

11. A control apparatus according to claim 10, wherein said reference torque values and said reference torque durations are previously determined in relation to predetermined vehicle seeds, respectively, and stored in the form of a table in said storing means (32) so that said reference torque value and said reference torque duration can be read out from said storing means on the basis of said vehicle speed derived from output of said vehicle speed detecting means.

12. A control apparatus according to claim 8, further comprising:

motor rotation decision means for deciding whether or not a current rotation number of said motor is greater than a predetermined value;

wherein when said current rotation number of said motor is greater than said predetermined value, said motor rotation decision means generates an invalidation signal, and said motor fault monitor/control means, in response to said invalidation signal, controls operation of said clutch control means so as to inhibit said electrical energization of said electromagnetic clutch means from being decreased notwithstanding said abnormal torque detection signal.

13. A control apparatus according to claim 8, wherein when said current rotation number of said motor is not greater than said predetermined value, said motor fault monitor/control means controls said clutch control means so as to increase continuously the coupling effort of said electromagnetic clutch means at least to a level corresponding to said electrically partially energized state while neglecting said abnormal torque detection signal.

14. A control apparatus according to claim 8, wherein said predetermined value is substantially zero.

15. A control apparatus according to claim 8, further comprising:

time measuring means for measuring a duration for which a rotation number of said motor remains continuously greater than a predetermined value for thereby generating a corresponding time signal; and decision means incorporated in said motor fault monitor/control means for deciding on the basis of said time signal whether said duration is greater than a threshold value;

wherein when said current rotation number of said motor is greater than said predetermined value and when said duration is greater than said threshold value, said motor fault monitor/control means controls operation of said clutch control means so as to inhibit said electrical energization of said electromagnetic clutch means from being decreased notwithstanding said abnormal torque detection signal.

16. A control apparatus according to claim 8, further comprising:

steering angle detection means for detecting an angle of steering of said steering mechanism; and steering angle comparison means for comparing said steering angle detected by said steering angle detection means with a predetermined steering angle;

wherein when said detected steering angle is greater than said predetermined steering angle, said steering angle comparison means generates an invalidation signal, and said motor fault monitor/control means, in response to said invalidation signal from said steering angle comparison means, controls operation of said clutch control means so as to inhibit said electrical energization of said electromagnetic clutch means from being decreased regardless of said abnormal torque detection signal.

17. A control apparatus according to claim 16, wherein a plurality of predetermined steering angles are stored in a memory (61) in correspondence to predetermined vehicle speeds, respectively, so that one of said predetermined steering angles can be read out from said memory on the basis of said vehicle speed derived from the output of said vehicle speed detecting means.

18. A control apparatus according to claim 8, further comprising:

motor rotation decision means for deciding whether or not a current rotation number of said motor is greater than a predetermined value;

wherein when said current rotation number of said motor is greater than said predetermined value and when said detected steering angle is greater than said predetermined angle, said motor fault monitor/control means controls operation of said clutch control means so as to inhibit said electrical energization of said electromagnetic clutch means from being decreased regardless of said abnormal torque detection signal.

19. A control apparatus according to claim 8, further comprising:

time measuring means for measuring a duration for which a rotation number of said motor remains continuously greater than a predetermined value for thereby generating a corresponding time signal; and decision means incorporated in said motor fault monitor/control means for deciding on the basis of said time signal whether said duration is greater than a threshold value;

wherein when a detected steering angle is greater than a predetermined steering angle and when said duration is greater than said threshold value, said motor fault monitor/control means controls operation of said clutch control means so as to inhibit said electrical energization of said electromagnetic clutch means from being decreased notwithstanding said abnormal torque detection signal.

20. A control apparatus for a motor-driven power steering system of a motor vehicle, comprising:

vehicle speed detecting means for detecting a vehicle speed of said motor vehicle;

steering torque detecting means for detecting a steering torque applied to said steering system;

current calculating/driving means for outputting a motor current command value on the basis of said vehicle speed detected by said vehicle speed detecting means and said steering torque detected by said steering torque detecting means;

an assist torque generating electric motor operatively coupled to a steering mechanism through the medium of an electromagnetic clutch means and generating an assist torque to be applied to said steering system on the basis of said motor current command value;

clutch control means for controlling a coupling effort of said electromagnetic clutch means;

abnormal torque decision reference value arithmetic means for arithmetically determining an abnormal torque and a vehicle speed corresponding to said abnormal torque during a predetermined reference period to thereby output an abnormal torque decision reference value indicating said abnormal torque corresponding to the vehicle speed detected by said vehicle speed detecting means;

load torque arithmetic means for arithmetically determining a load torque value indicating a sum of the steering torque detected by said steering torque detecting means and said assist torque generated by said electric motor;

torque comparison means for comparing said load torque value with said abnormal torque decision reference value; and motor fault monitor/control means responsive to a result of said comparison indicating that said load torque value is greater than said abnormal torque decision reference value, to thereby control said clutch control means so that the coupling effort of said electromagnetic clutch means is lowered in a continuous manner to a predetermined coupling effort which permits manual operation of said steering system.

21. A control apparatus for a power steering system according to claim 20, further comprising:

motor rotation decision means for deciding whether said assist torque generating motor is rotating or not;

wherein when it is decided by said motor rotation decision means that said assist torque generating motor is rotating, said motor fault monitor/control means controls said clutch control means such that the coupling effort of said electromagnetic clutch means is continuously increased up to said predetermined coupling effort.

22. A control apparatus for a power steering system according to claim 21, further comprising:

torque comparison inhibiting means for inhibiting the comparing operation of said torque comparison means when decision is made by said motor rotation decision means that said assist torque generating motor is rotating.

23. A control apparatus for a power steering system according to claim 20, further comprising:

steering angle detecting means for detecting an angle of steering of said steering system; and torque comparison inhibiting means for disabling the comparing operation of said torque comparison means when said angle of steering is not smaller than a predetermined angle.

24. A control apparatus for a power steering system according to claim 20, further comprising:

steering angle detecting means for detecting an angle of steering of said steering system;

torque comparison inhibiting means for reading from a plurality of reference angles of steering stored previously in correspondence to a plurality of different vehicle speeds a reference angle of steering which coincides with said vehicle speed detected by said vehicle speed detecting means to compare said angle of steering detected by said steering angle detecting means with said reference steering angle for thereby disabling the comparing operation of said torque comparison means when said detected angle of steering is not smaller than said reference angle of steering.

25. A control apparatus for a power steering system according to claim 20, further comprising:

torque comparison inhibiting means for disabling the comparing operation of said torque comparison means when said vehicle speed detected by said vehicle speed detecting means is not higher than a reference vehicle speed.

26. A control apparatus for a motor-driven power steering system of a motor vehicle, comprising:

vehicle speed detecting means for detecting a vehicle speed of said motor vehicle;

steering torque detecting means for detecting a steering torque applied to said steering system;

current calculating/driving means for outputting a motor current command value on the basis of said vehicle speed detected by said vehicle speed detecting means and said steering torque detected by said steering torque detecting means;

an assist torque generating electric motor coupled to said steering system through the medium of an electromagnetic clutch means and generating an assist torque to be applied to said steering system on the basis of said motor current command value;

clutch control means for controlling a coupling effort of said electromagnetic clutch means;

abnormal torque decision reference value arithmetic means for arithmetically determining an abnormal torque and a vehicle speed corresponding to said abnormal torque for a predetermined reference temporal duration to thereby output both an abnormal torque decision reference value indicating said abnormal torque corresponding to said vehicle speed detected by said vehicle speed detecting means and said reference temporal duration;

load torque arithmetic means for arithmetically determining both a load torque value indicating a sum of said steering torque detected by said steering torque detecting means and said assist torque generated by said electric motor and a temporal duration of said load torque;

torque comparison means for comparing said load torque value with said abnormal torque decision reference value and comparing said temporal duration of said load torque value with said reference temporal duration; and motor fault monitor/control means responsive to results of said comparisons indicating that said load torque value is greater than said abnormal torque decision value and that the temporal duration of said load torque value is not shorter than said reference temporal duration, to thereby control said clutch control means so that the coupling effort of said electromagnetic clutch means is lowered in a continuous manner to a predetermined coupling effort which permits manual steering.

27. A control apparatus for a power steering system according to claim 26, further comprising:

motor rotation decision means for deciding whether said assist torque generating motor is rotating or not;

wherein when it is decided by said motor rotation decision means that said assist torque generating motor is rotating, said motor fault monitor/control means control said clutch control means such that the coupling effort of said electromagnetic clutch means is continuously increased up to said predetermined coupling effort.

28. A control apparatus for a power steering system according to claim 27, further comprising:

torque comparison inhibiting means for inhibiting the comparing operation of said torque comparison means when decision is made by said motor rotation decision means that said assist torque generating motor is rotating.

29. A control apparatus for a power steering system according to claim 26, further comprising:

steering angle detecting means for detecting an angle of steering of said steering system; and torque comparison inhibiting means for disabling the comparing operation of said torque comparison means when said angle of steering is not smaller than a predetermined angle.

30. A control apparatus for a power steering system according to claim 26, further comprising:

steering angle detecting means for detecting an angle of steering of said steering system; and torque comparison inhibiting means for reading from a plurality of reference angles of steering stored previously in correspondence to a plurality of different vehicle speeds a reference angle of steering which coincides with said vehicle speed detected by said vehicle speed detecting means to compare said angle of steering detected by said steering angle detecting means with said reference steering angle for thereby disabling the comparing operation of said torque comparison means when said detected angle of steering is not smaller than said reference angle of steering.

31. A control apparatus for a power steering system according to claim 26, further comprising:

torque comparison inhibiting means for disabling the comparing operation of said torque comparison means when said vehicle speed detected by said vehicle speed detecting means is not higher than a reference vehicle speed.

32. In a motor-driven power steering system of a motor vehicle which includes a steering mechanism for steering said motor vehicle, an electric motor for generating an assist torque to be applied to said steering mechanism for facilitating steering operation of said motor vehicle, and electromagnetic clutch means for transmitting said assist torque to said steering mechanism, said electromagnetic clutch means being of such a type that magnitude of a coupling effort thereof can continuously and controllably changed at least over a range from an electrically partially energized state of said electromagnetic clutch means to an electrically fully energized state thereof, wherein in said electrically fully energized state of said electromagnetic clutch means, said assist torque generated by said motor can be transmitted to said steering mechanism at maximum, while in said electrically partially energized state of said electromagnetic clutch means, transmission of said assist torque to said steering mechanism is limited to such extent that said steering mechanism can manually be manipulated independent of the state of said electric motor;

a method for controlling said electromagnetic clutch means, comprising the steps of:

storing reference torque values determined previously in correspondence to predetermined vehicle speeds, respectively;

detecting a current vehicle speed;

detecting a steering torque being applied to said steering mechanism;

reading out from said stored reference torque values a reference torque value which corresponds to said current vehicle speed;

detecting a motor current flowing through said electric motor to generate a motor current signal;

determining a load torque acting on said steering system on the basis of said detected steering torque and said motor current to thereby decide a load torque;

comparing said load torque with said reference torque value as read out to thereby output an abnormal torque signal when said load torque exceeds said reference torque value; and controlling said electromagnetic clutch means in response to the abnormal torque signal so that said electrical energization of said electromagnetic clutch means is continuously decreased to a level corresponding to said electrically partially energized state.

33. A control method according to claim 32, comprising the steps of:

storing reference torque durations determined previously in correspondence to predetermined vehicle speeds, respectively;

reading out from said reference torque durations as stored a reference torque duration which corresponds to said vehicle speed;

determining a duration of said load torque on the basis of said detected steering torque and said motor current flowing through said motor to generate a load torque duration signal; and comparing said load torque with said reference torque value as read out while comparing said load torque duration signal with said reference torque duration, to thereby output said abnormal torque signal when said load torque exceeds said reference torque value and when said duration of said load torque exceeds said reference torque duration.

34. A control method according to claim 32, further comprising the steps of:

deciding whether or not a current rotation number of said motor is greater than a predetermined value;

generating an invalidation signal when said current rotation number of said motor is greater than said predetermined value; and controlling said electromagnetic clutch means in response to said invalidation signal such that said electrical energization of said electromagnetic clutch means is prevented from being decreased notwithstanding of said abnormal torque detection signal.

35. A control method according to claim 32, further comprising the steps of:

measuring a duration for which a rotation number of said motor remains continuously greater than a predetermined value for thereby generating a corresponding time signal; and deciding on the basis of said time signal whether said duration is greater than a threshold value;

wherein when said rotation number of said motor is greater than said predetermined value and when said duration is greater than said threshold value, said electrical energization of said electromagnetic clutch means is prevented from being decreased.

36. A control method according to claim 32, further comprising the steps of:

detecting a steering angle of said steering mechanism; and comparing said steering angle as detected with a predetermined steering angle;

wherein when said detected steering angle is greater than said predetermined steering angle, said electrical energization of said electromagnetic clutch means is inhibited from being decreased.

* * * * *